United States Patent
Wang et al.

(10) Patent No.: US 11,363,666 B2
(45) Date of Patent: Jun. 14, 2022

(54) DATA TRANSMISSION METHOD AND RELATED DEVICE

(71) Applicant: HUAWEI TECHNOLOGIES CO., LTD., Guangdong (CN)

(72) Inventors: Hong Wang, Beijing (CN); Wei Quan, Beijing (CN); Zheng Yu, Beijing (CN); Yue Zhao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/829,243

(22) Filed: Mar. 25, 2020

(65) Prior Publication Data

US 2020/0229265 A1    Jul. 16, 2020

Related U.S. Application Data

(63) Continuation of application No. PCT/CN2017/103422, filed on Sep. 26, 2017.

(51) Int. Cl.
*H04W 76/27* (2018.01)
*H04W 76/11* (2018.01)
(Continued)

(52) U.S. Cl.
CPC .......... *H04W 76/27* (2018.02); *H04L 1/0003* (2013.01); *H04W 8/04* (2013.01); *H04W 8/08* (2013.01);
(Continued)

(58) Field of Classification Search
CPC ....... H04W 76/27; H04W 76/11; H04W 8/04; H04W 8/08; H04W 8/245; H04W 24/08;
(Continued)

(56) References Cited

U.S. PATENT DOCUMENTS

| 2015/0249972 | A1* | 9/2015 | You | H04L 5/0035 370/254 |
| 2015/0282208 | A1  | 10/2015 | Yi et al. | |

(Continued)

FOREIGN PATENT DOCUMENTS

| CN | 103491622 A | 1/2014 |
| CN | 103763748 A | 4/2014 |

OTHER PUBLICATIONS

3GPP TS 36.300 V14.4.0 (Sep. 2017), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," Sep. 2017, 329 pages.

(Continued)

*Primary Examiner* — Jianye Wu
(74) *Attorney, Agent, or Firm* — Fish & Richardson P.C.

(57) ABSTRACT

Embodiments of this application disclose example data transmission methods and example devices. One example method includes receiving, by a first network device, resource configuration assistance information, where the resource configuration assistance information is used to indicate a communication pattern of user equipment. The first network device can then send dedicated resource configuration information to the user equipment based on the resource configuration assistance information, where the dedicated resource configuration information is used by the user equipment in a radio resource control (RRC) non-connected state to access the first network device, and where the RRC non-connected state is an RRC idle state or an RRC inactive state. The first network device can then perform data transmission with the user equipment by using the dedicated resource configuration information.

20 Claims, 10 Drawing Sheets

(51) Int. Cl.
  *H04L 1/00* (2006.01)
  *H04W 8/04* (2009.01)
  *H04W 8/08* (2009.01)
  *H04W 8/24* (2009.01)
  *H04W 24/08* (2009.01)
  *H04W 72/12* (2009.01)
(52) U.S. Cl.
  CPC ............ *H04W 8/245* (2013.01); *H04W 24/08* (2013.01); *H04W 72/1273* (2013.01); *H04W 76/11* (2018.02)
(58) Field of Classification Search
  CPC ......... H04W 72/0433; H04W 72/1273; H04W 72/048; H04W 88/14; H04L 1/0003
  See application file for complete search history.

(56) References Cited

U.S. PATENT DOCUMENTS

2017/0019820 A1 1/2017 Das
2017/0295601 A1* 10/2017 Kim .................. H04W 72/0406

OTHER PUBLICATIONS

3GPP TS 36.213 V14.4.0 (Sep. 2017), "3rd Generation Partnership Project; Technical Specification Group Radio Access Network; Evolved Universal Terrestrial Radio Access (E-UTRA); Physical layer procedures (Release 14)," Sep. 2017, 461 pages.
Samsung,"TS 23.501 General description of CN assistance information",SA WG2 Meeting #S2-122, S2-174658, San Jose Del Cabo, Mexico, Jun. 26-30, 2017, 5 pages.
Huawei et al.,"UE differentiation",3GPP TSG-RAN WG2 Meeting #99, R2-1708309, Berlin, Germany, Aug. 21-25, 2017, 4 pages.
MediaTek Inc.,"NB-IOT UE Differentiation",3GPP TSG-RAN WG2 Meeting #99, R2-1708999, Berlin, Germany, Aug. 21-25, 2017, 3 pages.
Extended European Search Report issued in European Application No. 17926988.1 dated Jul. 10, 2020, 12 pages.
3GPP TS 23.401 V15.1.0 (Sep. 2017), 3rd Generation Partnership Project; Technical Specification Group Services and System Aspects; General Packet Radio Service (GPRS) enhancements for Evolved Universal Terrestrial Radio Access Network (E-UTRAN) access (Release 15), Sep. 2017, 397 pages.
3GPP TS 23.682 V15.2.0 (Sep. 2017), "3rd Generation Partnership Project; Technical Specification Group Services and System Aspects; Architecture enhancements to facilitate communications with packet data networks and applications (Release 15)," Sep. 2017. 122 pages.
3GPP TS 36.331 V14.4.0 (Sep. 2017), "3rd Generation Partnership Project; Technical Specification Group Radio Access Network; Evolved Universal Terrestrial Radio Access (E-UTRA); Radio Resource Control (RRC); Protocol specification (Release 14)," Sep. 2017, 753 pages.
Qualcomm Incorporated, "Early data transmission," 3GPP TSG-RAN WG1 Meeting #89, R1-1708800; Hangzhou, China, May 15-19, 2017, 10 pages.
Huawei, HiSilicon, "Early data transmission on dedicated resource for Rel-15 MTC," 3GPP TSG RAN WG2 #99 Meeting, R2-1709334; Berlin, Germany, Aug. 21-25, 2017, 2 pages.
Huawei, HiSilicon, "Enhanced UP solution for early data transmission in MTC," 3GPP TSG RAN WG2 Meeting #99 Meeting, R2-1709335; Berlin, Germany, Aug. 21-25, 2017, 3 pages.
Office Action issued in Chinese Application No. 201780092495.7 dated May 29, 2020, 22 pages (with English translation).
PCT International Search Report and Written Opinion issued in International Application No. PCT/CN2017/103422 dated Jun. 15, 2018, 14 pages (with English translation).
Qualcomm Incorporated, "Early data transmission," 3GPP TSG RAN WG1 Meeting #90, R1-1712804; Prague, Czechia, Aug. 21-25, 2017, 16 pages.
Veolia, "WF on power consumption reduction for NB-IoT," 3GPP TSG-RAN WG2 Meeting #99, R2-1709543; Berlin, Germany, 221-25 Aug. 2017, 5 pages.
3GPP TS 23.682 V15.1.0 (Sep. 2017), "3rd Generation Partnership Project;Technical Specification Group Services and System Aspects;Architecture enhancements to facilitate communications with packet data networks and applications (Release 15)," Jun. 2017, 118 pages.
EPO Communication pursuant to Article 94(3) EPC issued in European Application No. 17926988.1 dated Oct. 19, 2021, 12 pages.

* cited by examiner

DATA TRANSMISSION METHOD AND RELATED DEVICE

CROSS-REFERENCE TO RELATED APPLICATIONS

This application is a continuation of International Application No. PCT/CN2017/103422, filed on Sep. 26, 2017, the disclosure of which is hereby incorporated by reference in its entirety.

TECHNICAL FIELD

This application relates to the communications field, and in particular, to a data transmission method and a related device.

BACKGROUND

Currently, a mobile wireless network is mainly designed for mobile user equipment (user equipment, UE) or a mobile terminal device, so that the UE can access a wireless network regardless of which location the UE is moved to. In this way, complexity of processing mobility by a network side is increased. In a current wireless network, entities that deal with a mobility problem mainly include a base station and a mobility management entity (mobility management entity, MME), and both of the base station and the mobility management entity are designed with a complex mobile handover process. Moreover, because the UE can move among different base stations, a resource used by the UE when the UE initially accesses a base station is not configured specifically for the UE, but is configured by using a broadcast message, and can be randomly used by all UEs. In an existing LTE system, a contention-based random access mode is used when UE initially accesses a base station. The random access mode includes the following steps: 1. The UE randomly selects a random access preamble and a time-frequency resource based on a system message broadcasted by the base station, and sends the selected random access preamble to the base station by using the selected time-frequency resource: 2. after receiving the random access preamble, the base station sends a random access response message to the UE; 3. the UE sends a radio resource control connection request (radio resource control connection request, RRCConnectionRequest) message to the base station by using an uplink resource carried in the random access response message; and 4. the base station sends a random access contention resolution message to the UE. Subsequently, the UE can send uplink data to an eNB, or the eNB can send downlink data to the UE. It can be learned that the foregoing random access procedure is needed to implement data transmission between the UE and the eNB. This increases a latency of data transmission and power consumption of the UE, and decreases resource utilization efficiency.

With diversified evolutions of terminal devices, some terminal devices are fixed at one position since deployment, or stay stationary for a fairly long time, or move within a relatively small range. For example, usually, a household device is not moved out of a house. For these devices, a mobility problem thereof can be ignored, that is, there is no need to design a complex mobile handover process. In addition, because these terminal devices have relatively fixed positions relative to base stations, and base stations are usually not changed, an existing random access procedure can be simplified, to reduce a latency of data transmission and power consumption of UE, and improve resource utilization efficiency.

SUMMARY

Embodiments of this application provide a data transmission method and a related device, to reduce a latency of data transmission and power consumption of UE, and improve resource utilization efficiency.

A first aspect of this application provides a data transmission method, including: receiving, by a first network device, resource configuration assistance information, where the resource configuration assistance information is used to indicate a communication pattern of user equipment, and the user equipment can be a device fixed at a specific position or a device that has a very small moving range and that usually does not change a serving cell thereof; sending, by the first network device, dedicated resource configuration information to the user equipment based on the resource configuration assistance information, where the dedicated resource configuration information is used by the user equipment in an RRC non-connected state to access the first network device, and the RRC non-connected state is an RRC idle state or an RRC inactive state; and performing, by the first network device after the user equipment obtains the dedicated resource configuration information, data transmission with the user equipment by using the dedicated resource configuration information. In this embodiment of this application, the first network device configures a dedicated access resource for the user equipment, and the dedicated access resource is used by the user equipment in the RRC non-connected state to access the first network device, so that the first network device can perform data transmission with the user equipment, to reduce a latency of accessing a network by the user equipment and power consumption during the process of accessing the network by the user equipment.

In a possible design, in a first implementation of the first aspect of this embodiment of this application, the receiving, by a first network device, resource configuration assistance information includes: receiving, by the first network device, the resource configuration assistance information sent by a second network device, where the second network device is a mobility management entity MME or a home subscriber server HSS or a service capability exposure function unit SCEF or a service capability server SCS or an application server AS; or receiving, by the first network device, the resource configuration assistance information sent by the user equipment, where the resource configuration assistance information includes one or more of the following parameters: a periodic communication indicator, communication duration, a communication period, a scheduling starting time, a data volume indication, a scheduled communication time and a stationary indication. In this implementation, manners of obtaining the resource configuration assistance information by the first network device and contents that may be included in the resource configuration assistance information are specified, so that the embodiments of this application are more operable.

In a possible design, in a second implementation of the first aspect of this embodiment of this application, the dedicated resource configuration information includes an uplink parameter and/or a downlink parameter. The uplink parameter includes a first resource, the first resource is used by the user equipment to request an uplink resource from the first network device, and the first resource includes: a dedicated random access preamble for the user equipment;

or a dedicated random access time-frequency resource for the user equipment; or a scheduling request SR resource; and the downlink parameter includes a second resource, the second resource is used by the user equipment to monitor downlink data, and the second resource includes a dedicated radio network temporary identifier RNTI for the user equipment, where the dedicated RNTI is used by the user equipment to monitor the downlink data. In this implementation, information that may be included in the first resource in the uplink parameter and information that may be included in the second resource in the downlink parameter are specified, to make this implementation of this embodiment of this application more complete.

In a possible design, in a third implementation of the first aspect in this embodiment of this application, the uplink parameter further includes: a validity time of the first resource and/or indication information, where the indication information is used to indicate service data volume information; and/or the downlink parameter further includes: a validity time of the second resource. In this implementation, contents that may further be included in the uplink parameter and the downlink parameter are added, to make features of this embodiment of this application more complete.

In a possible design, in a fourth implementation of the first aspect of this embodiment of this application, the performing, by the first network device, data transmission with the user equipment by using the dedicated resource configuration information includes: receiving, by the first network device, a resource request message sent by the user equipment based on the dedicated resource configuration information, where the resource request message is used to request the first network device to allocate an uplink resource; sending, by the first network device, uplink grant information to the user equipment, where the uplink grant information is used to indicate the uplink resource used by the user equipment to send uplink data; and receiving, by the first network device based on the uplink grant information, the uplink data sent by the user equipment. In this implementation, the first network device receives the resource request message sent by the user equipment, and sends the uplink grant information to the user equipment, so that the user equipment learns of the uplink resource used by the user equipment to send the uplink data, thereby providing a process of uplink data transmission between the first network device and the user equipment.

In a possible design, in a fifth implementation of the first aspect of this embodiment of this application, the receiving, by the first network device, a resource request message sent by the user equipment based on the dedicated resource configuration information includes:

receiving, by the first network device when the uplink parameter in the dedicated resource configuration information includes the first resource, on the first resource, the resource request message sent by the user equipment based on the first resource; or receiving, by the first network device when the uplink parameter in the dedicated resource configuration information includes the first resource and a validity time of the first resource, on the first resource and in the validity time of the first resource, the resource request message sent by the user equipment based on the first resource and the validity time of the first resource. In this implementation, a manner of receiving, by the first network device when the uplink parameter in the dedicated resource configuration information includes the first resource or the first resource and the validity time of the first resource, the resource request message sent by the user equipment is provided, thereby increasing application scenarios of this embodiment of this application.

In a possible design, in a sixth implementation of the first aspect of this embodiment of this application, the sending, by the first network device, uplink grant information to the user equipment includes: sending, by the first network device when an uplink parameter in the dedicated resource configuration information includes the indication information, the uplink grant information to the user equipment based on the indication information.

In a possible design, in a seventh implementation of the first aspect of this embodiment of this application, the receiving, by the first network device, a resource request message sent by the user equipment based on the dedicated resource configuration information includes:

receiving, by the first network device when the dedicated resource configuration information includes the dedicated random access preamble for the user equipment, the dedicated random access preamble for the user equipment sent by the user equipment, where the dedicated random access preamble for the user equipment is included in the resource request message; or receiving, by the first network device when the dedicated resource configuration information includes the dedicated random access preamble for the user equipment and a validity time of the dedicated random access preamble, in the validity time of the dedicated random access preamble, the dedicated random access preamble for the user equipment sent by the user equipment, where the dedicated random access preamble for the user equipment is included in the resource request message; or receiving, by the first network device when the dedicated resource configuration information includes the dedicated random access time-frequency resource for the user equipment, on the dedicated random access time-frequency resource, a random access preamble sent by the user equipment by using the dedicated random access time-frequency resource for the user equipment, where the random access preamble is included in the resource request message; or receiving, by the first network device when the dedicated resource configuration information includes the dedicated random access time-frequency resource for the user equipment and a validity time of the dedicated random access time-frequency resource, in the validity time of the dedicated random access time-frequency resource, a random access preamble sent by the user equipment by using the dedicated random access time-frequency resource for the user equipment, where the random access preamble is included in the resource request message; or receiving, by the first network device when the dedicated resource configuration information includes the scheduling request SR resource, on the SR resource, an SR sent by the user equipment by using the SR resource, where the SR is included in the resource request message; or receiving, by the first network device when the dedicated resource configuration information includes the scheduling request SR resource and a validity time of the SR resource, in the validity time of the SR resource, an SR sent by the user equipment by using the SR resource, where the SR is included in the resource request message. In this implementation, based on the information that may be included in the uplink parameter, specific manners of receiving, by the first network device, the resource request message sent by the user equipment are provided, to make implementation steps in this embodiment of this application more complete.

In a possible design, in an eighth implementation of the first aspect of this embodiment of this application, during the performing, by the first network device, data transmission with the user equipment by using the dedicated resource configuration information, the method further includes: requesting, by the first network device when the first network device or the second network device does not activate context information of a terminal, the second network device to activate the context information of the terminal. In this implementation, requesting, by the first network device if neither of the first network device and the second network device activates the context information of the terminal, a core network to activate the context information is added, to make implementation steps in this embodiment of this application more complete.

In a possible design, in a ninth implementation of the first aspect of this embodiment of this application, the performing, by the first network device, data transmission with the user equipment by using the dedicated resource configuration information includes: sending, by the first network device when the dedicated resource configuration information includes the dedicated RNTI for the user equipment, downlink data to the user equipment by using the dedicated RNTI for the user equipment; or sending, by the first network device when the dedicated resource configuration information includes the dedicated RNTI for the user equipment and a validity time of the dedicated RNTI, the downlink data to the user equipment by using the dedicated radio network temporary identifier RNTI for the user equipment in the validity time of the dedicated RNTI. In this implementation, a scenario in which the first network device configures the dedicated RNTI for the user equipment to schedule the downlink data for the UE is provided, thereby enriching contents of this embodiment of this application.

In a possible design, in a tenth implementation of the first aspect of this embodiment of this application, the dedicated resource configuration information includes uplink resource scheduling information and/or downlink resource scheduling information, the uplink resource scheduling information is used by the user equipment to send the uplink data to the first network device, and the downlink resource scheduling information is used by the first network device to send the downlink data to the user equipment.

In a possible design, in an eleventh implementation of the first aspect of this embodiment of this application, the performing, by the first network device, data transmission with the user equipment by using the dedicated resource configuration information includes: receiving, by the first network device by using the uplink resource scheduling information, the uplink data sent by the user equipment; or sending, by the first network device, the downlink data to the user equipment by using the downlink resource scheduling information.

A second aspect of this application provides a data transmission method, including: receiving, by user equipment, dedicated resource configuration information sent by a first network device, where the dedicated resource configuration information is used by the user equipment in an RRC non-connected state to access the first network device, and the RRC non-connected state is an RRC idle state or an RRC inactive state; and performing, by the user equipment, data transmission with the first network device by using the dedicated resource configuration information. In this embodiment of this application, the user equipment in the RRC non-connected state accesses the first network device through a dedicated access resource configured by the first network device, and the user equipment can further send the uplink data to the first network device on the specified resource configured by the first network device, to reduce a latency of accessing a network by the user equipment and power consumption during the process of accessing the network by the user equipment.

In a possible design, in a first implementation of the second aspect of this embodiment of this application, before the receiving, by the user equipment, dedicated resource configuration information sent by the first network device, the method further includes: sending, by the user equipment, resource configuration assistance information to the first network device, where the resource configuration assistance information is used to indicate a communication pattern of the user equipment, and the resource configuration assistance information includes one or more of the following parameters: a periodic communication indicator, communication duration, a communication period, a scheduled communication time, a scheduling starting time, a data volume indication and a stationary indication. In this implementation, a manner of reporting the resource configuration assistance information to the first network device by the user equipment is provided, and contents that may be included in the resource configuration assistance information are specified, so that the embodiments of this application are more operable.

In a possible design, in a second implementation of the second aspect of this embodiment of this application, the dedicated resource configuration information includes an uplink parameter and/or a downlink parameter. The uplink parameter includes a first resource, and the first resource includes:

a dedicated random access preamble for the user equipment; or a dedicated random access time-frequency resource for the user equipment; or a scheduling request SR resource; and the downlink parameter includes a second resource, and the second resource includes a dedicated radio network temporary identifier RNTI for the user equipment, where the dedicated RNTI is used by the user equipment to monitor the downlink data. In this implementation, information that may be included in the first resource in the uplink parameter and information that may be included in the second resource in the downlink parameter are specified, to make this implementation of this embodiment of this application more complete.

In a possible design, in a third implementation of the second aspect in this embodiment of this application, the uplink parameter further includes: a validity time of the first resource and/or indication information, where the indication information is used to indicate service data volume information; and/or the downlink parameter further includes: a validity time of the second resource. In this implementation, contents that may further be included in the uplink parameter and the downlink parameter are added, to make features of this embodiment of this application more complete.

In a possible design, in a fourth implementation of the second aspect of this embodiment of this application, the performing, by the user equipment, data transmission with the first network device by using the dedicated resource configuration information includes: sending, by the user equipment, a resource request message to the first network device based on the dedicated resource configuration information, where the resource request message is used to request the first network device to allocate an uplink resource; receiving, by the user equipment, configuration information sent by the first network device, where the configuration information carries uplink grant information, and the uplink grant information is used to indicate the uplink resource used by the user equipment to send uplink data; and sending, by the user equipment, the uplink data to the first network by using the uplink resource indicated by the uplink grant information. In this implementation, the user equipment sends the resource request message to the first network device, and receives the uplink grant information sent by the first network device, so that the user equipment learns of the uplink resource used by the user equipment to send the uplink data, thereby providing a process of uplink data transmission between the first network device and the user equipment.

In a possible design, in a fifth implementation of the second aspect of this embodiment of this application, the sending, by the user equipment, a resource request message to the first network device based on the dedicated resource configuration information includes: sending, by the user equipment when the uplink parameter in the dedicated resource configuration information includes the first resource, the resource request message to the first network device based on the first resource; or sending, by the user equipment when the uplink parameter in the dedicated resource configuration information includes the first resource and the validity time of the first resource, the resource request message to the first network device based on the first resource in the validity time of the first resource. In this implementation, a manner of sending the resource request message to the first network device by the user equipment if the uplink parameter in the dedicated resource configuration information includes the first resource, the first resource and the validity time of the first resource, or indication information is provided, thereby increasing application scenarios of this embodiment of this application.

In a possible design, in a sixth implementation of the second aspect of this embodiment of this application, the sending, by the user equipment, a resource request message to the first network device based on the dedicated resource configuration information includes: sending, by the user equipment when the uplink parameter in the dedicated resource configuration information further includes the indication information, the resource request message to the first network device based on the first resource corresponding to the indication information.

In a possible design, in a seventh implementation of the second aspect of this embodiment of this application, the sending, by the user equipment, a resource request message to the first network device based on the dedicated resource configuration information includes: sending, when the dedicated resource configuration information includes the dedicated random access preamble for the user equipment, the dedicated random access preamble for the user equipment to the first network device, where the dedicated random access preamble for the user equipment is included in the resource request message; sending, when the dedicated resource configuration information includes the dedicated random access preamble for the user equipment and a validity time of the dedicated random access preamble, the dedicated random access preamble for the user equipment to the first network device in the validity time of the dedicated random access preamble, where the dedicated random access preamble for the user equipment is included in the resource request message; or sending, when the dedicated resource configuration information includes the dedicated random access time-frequency resource for the user equipment, a random access preamble to the first network device by using the dedicated random access time-frequency resource for the user equipment, where the random access preamble is included in the resource request message; or sending, when the dedicated resource configuration information includes the dedicated random access time-frequency resource for the user equipment and a validity time of the dedicated random access time-frequency resource, a random access preamble to the first network device by using the dedicated random access time-frequency resource for the user equipment in the validity time of the dedicated random access time-frequency resource, where the random access preamble is included in the resource request message; or sending, when the dedicated resource configuration information includes the scheduling request SR resource, an SR to the first network device by using the SR resource, where the SR is included in the resource request message, or sending, when the dedicated resource configuration information includes the scheduling request SR resource and a validity time of the SR resource, an SR to the first network device by using the SR resource in the validity time of the SR resource, where the SR is included in the resource request message. In this implementation, based on the information that may be included in the uplink parameter, specific manners of sending, by the user equipment, the resource request message to the first network device are provided, to make implementation of steps in this embodiment of this application more complete.

In a possible design, in an eighth implementation of the second aspect of this embodiment of this application, the performing, by the user equipment, data transmission with the first network device by using the dedicated resource configuration information includes: monitoring, by the user equipment when the dedicated resource configuration information includes the dedicated RNTI for the user equipment, a physical downlink control channel by using the dedicated RNTI, where the physical downlink control channel is used to schedule downlink data; or monitoring, by the user equipment when the dedicated resource configuration information includes the dedicated RNTI for the user equipment and a validity time of the dedicated RNTI, a physical downlink control channel by using the dedicated RNTI in the validity time of the dedicated RNTI, where the physical downlink control channel is used to schedule downlink data. In this implementation, a scenario in which the user equipment monitors the downlink data based on the dedicated RNTI configured by the first network device for the user equipment and the validity time, or the dedicated RNTI is provided, thereby enriching contents of this embodiment of this application.

In a possible design, in a ninth implementation of the second aspect of this embodiment of this application, after the monitoring, by the user equipment, a physical downlink control channel by using the dedicated RNTI in the validity time of the dedicated RNTI, the method further includes: descrambling, by the user equipment, the downlink data based on the dedicated RNTI for the user equipment. In this implementation, the user equipment descrambles the downlink data by using the dedicated RNTI for the user equipment, thereby adding an operation step to this embodiment of this application.

In a possible design, in a tenth implementation of the second aspect of this embodiment of this application, the dedicated resource configuration information includes uplink resource scheduling information and/or downlink resource scheduling information, the uplink resource scheduling information is used by the user equipment to send the uplink data to the first network device, and the downlink resource scheduling information is used by the first network device to send the downlink data to the user equipment.

In a possible design, in an eleventh implementation of the second aspect of this embodiment of this application, the performing, by the user equipment, data transmission with the first network device by using the dedicated resource configuration information includes: sending, by the user equipment, the uplink data to the first network device by using the uplink resource scheduling information; or receiving, by the user equipment by using the downlink resource scheduling information, the downlink data sent by the first network device.

A third aspect of this application provides a network device. The network device is a first network device, and includes: a receiving unit, configured to receive resource configuration assistance information, where the resource configuration assistance information is used to indicate a communication pattern of user equipment; a first sending unit, configured to send dedicated resource configuration information to the user equipment based on the resource configuration assistance information, where the dedicated resource configuration information is used by the user equipment in an RRC non-connected state to access the first network device, and the RRC non-connected state is an RRC idle state or an RRC inactive state; and a processing unit, configured to perform data transmission with the user equipment by using the dedicated resource configuration information. In this embodiment of this application, the first network device configures a dedicated access resource for the user equipment in the RRC non-connected state to access the first network device, and the first network device performs data transmission with the user equipment by using the dedicated resource configuration information, to reduce a latency of accessing a network by the user equipment and power consumption during the process of accessing the network by the user equipment.

In a possible design, in a first implementation of the third aspect of the embodiments of this application, the receiving unit is specifically configured to: receive the resource configuration assistance information sent by a second network device, where the second network device is a mobility management implementation MME, a home subscriber server HSS, a service capability exposure function unit SCEF, a service capability server SCS, or an application server AS; or receive the resource configuration assistance information sent by the user equipment, where the resource configuration assistance information includes one or more of the following parameters: a periodic communication indicator, communication duration, a communication period, a scheduled starting time, a data volume indication, a scheduled communication time, and a stationary indication. In this implementation, manners of obtaining the resource configuration assistance information by the first network device and contents that may be included in the resource configuration assistance information are specified, so that the embodiments of this application are more operable.

In a possible design, in a second implementation of the third aspect of this embodiment of this application, the dedicated resource configuration information includes an uplink parameter and/or a downlink parameter. The uplink parameter includes a first resource, and the first resource includes:

a dedicated random access preamble for the user equipment; or a dedicated random access time-frequency resource for the user equipment; or a scheduling request SR resource; and/or the downlink parameter includes a second resource, and the second resource includes a dedicated radio network temporary identifier RNTI for the user equipment, where the dedicated RNTI is used by the user equipment to monitor the downlink data. In this implementation, information that may be included in the first resource in the uplink parameter and information that may be included in the second resource in the downlink parameter are specified, to make this implementation of this embodiment of this application more complete.

In a possible design, in a third implementation of the third aspect in this embodiment of this application, the uplink parameter further includes: a validity time of the first resource and/or indication information, where the indication information is used to indicate service data volume information; and the downlink parameter further includes: a validity time of the second resource. In this implementation, contents that may further be included in the uplink parameter and the downlink parameter are added, to make features of this embodiment of this application more complete.

In a possible design, in a fourth implementation of the third aspect of this embodiment of this application, the processing unit includes: a receiving module, configured to receive a resource request message sent by the user equipment based on the dedicated resource configuration information, where the resource request message is used to request the first network device to allocate an uplink resource; and a sending module, configured to send uplink grant information to the user equipment, where the uplink grant information is used to indicate the uplink resource used by the user equipment to send uplink data. The receiving module is further configured to receive, based on the uplink grant information, the uplink data sent by the user equipment. In this implementation, the first network device receives the resource request message sent by the user equipment, and sends the uplink grant information to the user equipment, so that the user equipment learns of the uplink resource used by the user equipment to send the uplink data, thereby providing a process of uplink data transmission between the first network device and the user equipment.

In a possible design, in a fifth implementation of the third aspect of this embodiment of this application, the receiving module is specifically configured to: receive, when the uplink parameter in the dedicated resource configuration information includes the first resource, on the first resource, the resource request message sent by the user equipment based on the first resource; or receiving, by the first network device when the uplink parameter in the dedicated resource configuration information includes the first resource and a validity time of the first resource, on the first resource and in the validity time of the first resource, the resource request message sent by the user equipment based on the first resource and the validity time of the first resource. In this implementation, a manner of receiving, by the first network device when the uplink parameter in the dedicated resource configuration information includes the first resource, or the first resource and the validity time of the first resource, the resource request message sent by the user equipment is provided, thereby increasing application scenarios of this embodiment of this application.

In a possible design, in a sixth implementation of the third aspect of this embodiment of this application, the sending module is specifically configured to: send, when the uplink parameter in the dedicated resource configuration information further includes the indication information, the uplink grant information to the user equipment based on the indication information.

In a possible design, in a seventh implementation of the third aspect of this embodiment of this application, the receiving module is specifically configured to receive, when the dedicated resource configuration information includes the dedicated random access preamble for the user equipment, the dedicated random access preamble for the user equipment sent by the user equipment, where the dedicated random access preamble for the user equipment is included in the resource request message; receive, when the dedicated resource configuration information includes the dedicated random access preamble for the user equipment and a validity time of the dedicated random access preamble, in the validity time of the dedicated random access preamble, the dedicated random access preamble for the user equipment sent by the user equipment, where the dedicated random access preamble for the user equipment is included in the resource request message; or receive, when the dedicated resource configuration information includes the dedicated random access time-frequency resource for the user equipment, on the dedicated random access time-frequency resource for the user equipment, a random access preamble sent by the user equipment by using the dedicated random access time-frequency resource for the user equipment, where the random access preamble is included in the resource request message; or receive, when the dedicated resource configuration information includes the dedicated random access time-frequency resource for the user equipment and a validity time of the dedicated random access time-frequency resource, in the validity time of the dedicated random access time-frequency resource, a random access preamble sent by the user equipment by using the dedicated random access time-frequency resource for the user equipment, where the random access preamble is included in the resource request message, or receive, when the dedicated resource configuration information includes the scheduling request SR resource, on the SR resource, an SR sent by the user equipment by using the SR resource, where the SR is included in the resource request message; or receive, when the dedicated resource configuration information includes the scheduling request SR resource and a validity time of the SR resource, in the validity time of the SR resource, an SR sent by the user equipment by using the SR resource, where the SR is included in the resource request message. In this implementation, based on information that may be included in the uplink parameter, specific manners of receiving, by the first network device, the resource request message sent by the user equipment are provided, to make implementation of steps in this embodiment of this application more complete.

In a possible design, in an eighth implementation of the third aspect of this embodiment of this application, when the first network device performs data transmission with the user equipment by using the dedicated resource configuration information, the network device further includes: a second sending unit, configured to request, when the first network device or the second network device does not activate context information of a terminal, the second network device to activate the context information of the terminal. In this implementation, a case in which if neither of the first network device and the second network device activates the context information of the terminal, the first network device requests a core network to activate the context information is added, to make implementation steps in this embodiment of this application more complete.

In a possible design, in an eighth implementation of the third aspect of this embodiment of this application, the processing unit includes: a sending module, configured to: send, when the dedicated resource configuration information includes the dedicated RNTI for the user equipment, downlink data to the user equipment by using the dedicated RNTI for the user equipment; or send, when the dedicated resource configuration information includes the dedicated RNTI for the user equipment and a validity time of the dedicated RNTI, the downlink data to the user equipment by using the dedicated radio network temporary identifier RNTI for the user equipment in the validity time of the dedicated RNTI.

A fourth aspect of this application provides user equipment, and the user equipment includes: a receiving unit, configured to receive dedicated resource configuration information sent by a first network device, where the dedicated resource configuration information is used by the user equipment in an RRC non-connected state to access the first network device, and the RRC non-connected state is an RRC idle state or an RRC inactive state; and a first processing unit, configured to perform data transmission with the first network device by using the dedicated resource configuration information. In this embodiment of this application, the user equipment in the RRC non-connected state accesses the first network device through a dedicated access resource configured by the first network device, and the user equipment can further send the uplink data to the first network device on the specified resource configured by the first network device, to reduce a latency of accessing a network by the user equipment and power consumption during the process of accessing the network by the user equipment.

In a possible design, in a first implementation of the fourth aspect of this embodiment of this application, before receiving the dedicated resource configuration information sent by the first network device, the user equipment further includes: a sending unit, configured to send resource configuration assistance information to the first network device, where the resource configuration assistance information is used to indicate a communication pattern of the user equipment, where the resource configuration assistance information includes one or more of the following parameters: a periodic communication indicator, communication duration, a communication period, a scheduled communication time, a scheduling starting time, a data volume indication, and a stationary indication. In this implementation, a manner of reporting the resource configuration assistance information to the first network device by the user equipment is provided, and contents that may be included in the resource configuration assistance information are specified, so that the embodiments of this application are more operable.

In a possible design, in a second implementation of the fourth aspect of this embodiment of this application, the dedicated resource configuration information includes an uplink parameter and/or a downlink parameter. The uplink parameter includes a first resource, and the first resource includes:

a dedicated random access preamble for the user equipment; or a dedicated random access time-frequency resource for the user equipment; or a scheduling request SR resource; and the downlink parameter includes a second resource, and the second resource includes a dedicated radio network temporary identifier RNTI for the user equipment, where the dedicated RNTI is used by the user equipment to monitor the downlink data. In this implementation, information that may be included in the first resource in the uplink parameter and information that may be included in the second resource in the downlink parameter are specified, to make this implementation of this embodiment of this application more complete.

In a possible design, in a third implementation of the fourth aspect in this embodiment of this application, the uplink parameter further includes: a validity time of the first resource and/or indication information, where the indication information is used to indicate service data volume information; and the downlink parameter further includes: a validity time of the second resource. In this implementation, contents that may further be included in the uplink parameter and the downlink parameter are added, to make features of this embodiment of this application more complete.

In a possible design, in a fourth implementation of the fourth aspect of this embodiment of this application, the first processing unit includes: a sending module, configured to send a resource request message to the first network device based on the dedicated resource configuration information, where the resource request message is used to request the first network device to allocate an uplink resource; and a receiving module, configured to receive configuration information sent by the first network device, where the configuration information carries uplink grant information, and the uplink grant information is used to indicate the uplink resource used by the user equipment to send uplink data. The sending module is further configured to send the uplink data to the first network by using the uplink resource indicated by the uplink grant information. In this implementation, the user equipment sends the resource request message to the first network device, and receives the uplink grant information sent by the first network device, so that the user equipment learns of the uplink resource used by the user equipment to send the uplink data, thereby providing a process of uplink data transmission between the first network device and the user equipment.

In a possible design, in a fifth implementation of the fourth aspect of this embodiment of this application, the sending module is specifically configured to: send, when the uplink parameter in the dedicated resource configuration information includes the first resource, the resource request message to the first network device based on the first resource; or send, when the uplink parameter in the dedicated resource configuration information includes the first resource and the validity time of the first resource, the resource request message to the first network device based on the first resource in the validity time of the first resource. In this implementation, a manner of sending the resource request message to the first network device by the user equipment if the uplink parameter in the dedicated resource configuration information includes the first resource or the first resource and the validity time of the first resource is provided, thereby increasing application scenarios of this embodiment of this application.

In a possible design, in a sixth implementation of the fourth aspect of this embodiment of this application, the sending module is specifically configured to: send, by the user equipment when the uplink parameter in the dedicated resource configuration information further includes indication information, the resource request message to the first network device based on the first resource corresponding to the indication information.

In a possible design, in a seventh implementation of the fourth aspect of this embodiment of this application, the sending module is specifically configured to: send, when the dedicated resource configuration information includes the dedicated random access preamble for the user equipment, the dedicated random access preamble for the user equipment to the first network device, where the dedicated random access preamble for the user equipment is included in the resource request message; or send, when the dedicated resource configuration information includes the dedicated random access preamble for the user equipment and a validity time of the dedicated random access preamble, the dedicated random access preamble for the user equipment to the first network device in the validity time of the dedicated random access preamble, where the dedicated random access preamble for the user equipment is included in the resource request message; or send, when the dedicated resource configuration information includes the dedicated random access time-frequency resource for the user equipment, a random access preamble to the first network device by using the dedicated random access time-frequency resource for the user equipment, where the random access preamble is included in the resource request message; or send, when the dedicated resource configuration information includes the dedicated random access time-frequency resource for the user equipment and a validity time of the dedicated random access time-frequency resource, a random access preamble to the first network device by using the dedicated random access time-frequency resource for the user equipment in the validity time of the dedicated random access time-frequency resource, where the random access preamble is included in the resource request message; or send, when the dedicated resource configuration information includes the scheduling request SR resource, an SR to the first network device by using the SR resource, where the SR is included in the resource request message, or send, when the dedicated resource configuration information includes the scheduling request SR resource and a validity time of the SR resource, an SR to the first network device by using the SR resource in the validity time of the SR resource, where the SR is included in the resource request message. In this implementation, based on information that may be included in the uplink parameter, specific manners of sending, by the user equipment, the resource request message to the first network device are provided, to make implementation of steps in this embodiment of this application more complete.

In a possible design, in an eighth implementation of the fourth aspect of this embodiment of this application, the first processing unit includes: a monitoring module, configured to monitor, when the dedicated resource configuration information includes the dedicated RNTI for the user equipment, a physical downlink control channel by using the dedicated RNTI, where the physical downlink control channel is used to schedule downlink data. Alternatively, the monitoring module is further configured to monitor, when the dedicated resource configuration information includes the dedicated RNTI for the user equipment and a validity time of the dedicated RNTI, a physical downlink control channel by using the dedicated RNTI in the validity time of the dedicated RNTI, where the physical downlink control channel is used to schedule downlink data. In this implementation, a scenario in which the user equipment monitors the downlink data based on the dedicated RNTI configured by the first network device for the user equipment and the validity time is provided, thereby enriching contents of this embodiment of this application.

In a possible design, in a ninth implementation of the fourth aspect of this embodiment of this application, the user equipment further includes: a second processing unit, configured to descramble the downlink data based on the dedicated RNTI for the user equipment. In this implementation, the user equipment descrambles the downlink data by using the dedicated C-RNTI for the user equipment, thereby adding an operation step to this embodiment of this application.

A fifth aspect of this application provides a computer-readable storage medium. The computer-readable storage medium stores an instruction, and when run on a computer, the instruction enables the computer to perform the methods according to the foregoing aspects.

A sixth aspect of this application provides a computer program product including an instruction, and when run on a computer, the computer program product enables the computer to perform the methods according to the foregoing aspects.

In technical solutions provided in the embodiments of this application, the user equipment in the RRC non-connected state accesses the first network device by using the dedicated access resource configured by the first network device, and the user equipment can further send the uplink data to the first network device on the specified resource configured by the first network device, to reduce the latency of accessing the network by the user equipment and the power consumption during the process of accessing the network by the user equipment.

DESCRIPTION OF EMBODIMENTS

Embodiments of this application provide a data transmission method and a related device, to reduce a latency of data transmission and power consumption of UE, and improve resource utilization efficiency.

In the specification, claims, and accompanying drawings of this application, the terms "first", "second", "third", "fourth", and so on (if existent) are intended to distinguish between similar objects but do not necessarily indicate a specific order or sequence. It should be understood that the terminology termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other steps or units not expressly listed or inherent to such a process, method, system, product, or device.

Figure 1A:
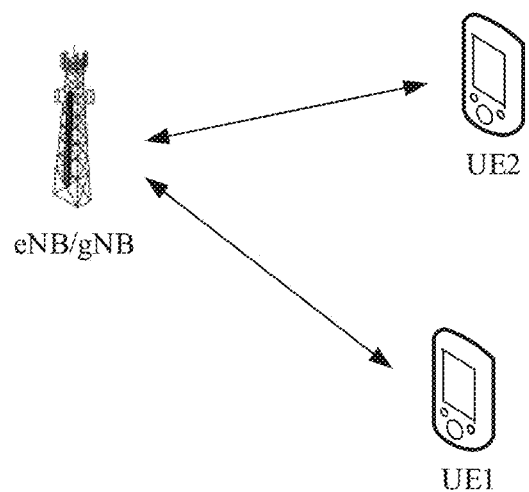
FIG. 1A is a diagram of a possible application scenario according to an embodiment of this application.
Figure 1B:
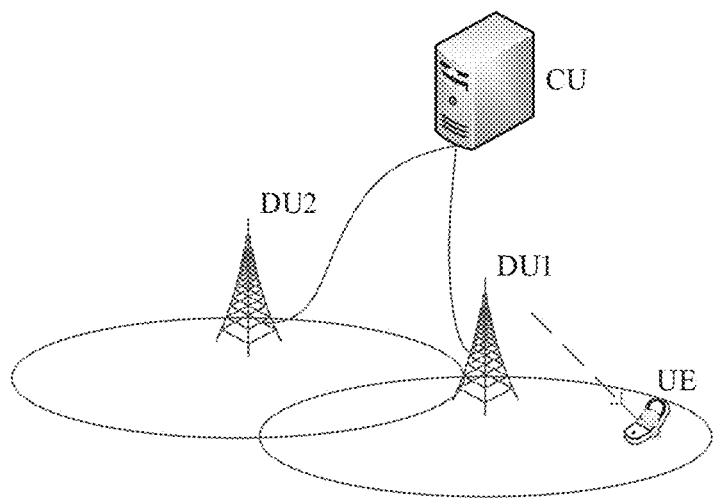
FIG. 1B is a diagram of another possible application scenario according to an embodiment of this application.

The embodiments of this application can be applied to a long-term evolution (long term evolution, LTE) system or a future communications system such as 4.5G or 5G. FIG. 1A is a diagram of a possible application scenario according to an embodiment of this application. A base station can be accessed by a plurality of user equipments, and the plurality of user equipments include UE1, UE2 and the like. In the LTE system, the base station may be an evolved NodeB (evolved node B, eNB). The eNB acts as a bridge between UE in the LTE system and an evolved packet core (Evolved Packet Core, EPC) network, and signaling and data can be directly transmitted between eNBs through an X2 interface. Main functions of the eNB include: radio resource management, IP header compression, and user data stream encryption, selection of a mobility management control node (Mobility Management Entity, MME) when UE is attached, routing user plane data to a serving gateway (serving gate way, S-GW), organizing and sending a paging message, organizing and sending a broadcast message, measurement for an objective of mobility or scheduling and measurement report configuration, and the like. It should be noted that the base station may further be represented by a gNB in 5G. The gNB may virtually exist. That is, some functions are on a distributed unit (distributed unit, DU), and some functions are on a centralized unit (centralized unit, CU). In addition, as shown in FIG. 1B, a plurality of DUs can be connected to a same CU.

In the foregoing application scenario, process steps used for non-mobile user equipment or user equipment with a relatively small moving range to access a base station in the prior art are similar to those of other user equipment, causing a relatively long time for the user equipment to access a network and waste of network resources. In view of this, this application provides a resource configuration method, to reduce a latency and power consumption of accessing a network by the user equipment.

Figure 1C:
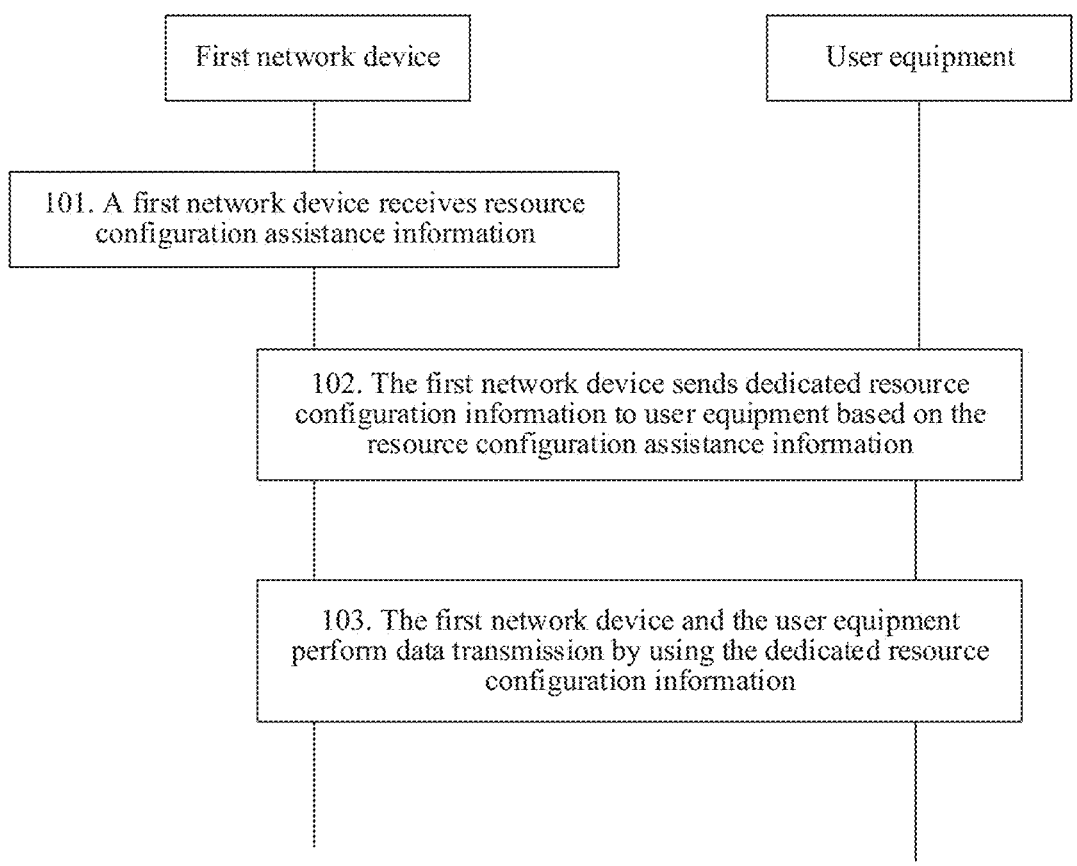
FIG. 1C is a schematic diagram of an embodiment of a possible data transmission method according to an embodiment of this application.

FIG. 1C is a flowchart of a resource configuration method according to an embodiment of this application. The method includes the following steps.

101. A first network device receives resource configuration assistance information.

The first network device receives the resource configuration assistance information, where the resource configuration assistance information is used to indicate a communication pattern of user equipment to the first network device, and the communication pattern is used to indicate a communication rule of the user equipment, for example, a communication period, a communication time segment, and a communication data volume. Optionally, the resource configuration assistance information is associated with one validity time (validity time), and the validity time is used to indicate a dead time of the resource configuration assistance information. If the validity time is exceeded, the resource configuration assistance information is deleted. In actual application, the resource configuration assistance information may include one or more pieces of the following information:

1) a periodic communication indicator (periodic communication indicator), used to indicate whether the user equipment communicates periodically, that is, whether the user equipment periodically receives and sends data:

2) communication duration (communication duration), used to indicate duration, for example, 5 min or 10 min, for the user equipment to perform data transmission once;

3) a communication period (communication period), used to indicate a period, for example, 1 hour or 1 day, of periodical communication performed by the user equipment;

4) a scheduled communication time (scheduled communication time), used to indicate a time during which the user equipment can communicate, for example, 13:00 to 13:30 on Monday;

5) a stationary indication (stationary indication), used to indicate a motion status of the user equipment, for example, that the user equipment is stationary or that the user equipment is moving;

6) a scheduling starting time (Scheduling starting time), used to indicate duration from a current time at which the user equipment configures the parameters to a next time at which the user equipment starts to be scheduled, where a unit may be, for example, a subframe (subframe), that is, 1 ms, or a system frame (system frame), that is, 10 ms, or a hyper system frame, that is, 10.24 s, or another time unit such as a second, a minute, an hour, a day, or a week, and this is not specifically limited herein; and 7) a data volume (Data Volume), where, for example, for a service such as a water meter or an electricity meter, a data volume reported by the user equipment is relatively small and fixed; and for a monitoring service, a data volume reported by the user equipment is relative large and variable; therefore, data volume indication information may indicate data volumes of some services, for example, 20 bytes, 50 bytes, or 100 bytes, and may further indicate whether the data volume is variable or relatively fixed.

It should be noted that, in this application, the parameters included in the resource configuration assistance information may further include, besides the foregoing examples of 7 parameters, another parameter based on an actual situation, and this is not specifically limited herein.

Optionally, the first network device may be a base station in actual application, for example, an eNB in the LTE system or a gNB in 5G, and this is not specifically limited herein.

Optionally, in actual application, the resource configuration assistance information may also be referred to as a communication pattern (communication pattern, CP) parameter, communication pattern information, or another, and this is not specifically limited herein.

It should be noted that there are a plurality of manners in which the first network device receives the resource configuration assistance information. For example, the first network device receives the resource configuration assistance information sent by a second network device, where the second network device may be a mobility management entity (mobility management Entity, MME), a home subscriber server (home subscriber server, HSS), a service capability exposure function unit (service capability exposure function, SCEF), a service capability server (service capability servers, SCS), or an application server (application server, AS). Specifically, the manner may include: sending, by the SCS/AS, an update request (update request) to the SCEF, where the update request carries a parameter instructing the user equipment to perform communication; selecting, by the SCEF, the needed resource configuration assistance information from the parameter in the update request, and sending an update parameter request (update parameter request) to the HSS; updating, by the HSS, subscription information of the user equipment based on the update parameter request, and sending the update parameter request (update parameter request) to the MME; and further, sending, by the MME, assistance information (assistance info) to the first network device, where the assistance information includes the resource configuration assistance information, so that the first network device can configure, based on the resource configuration assistance information, information of the user equipment when the user equipment accesses the first network device again. When the resource configuration assistance information is sent to the first network device by the MME, the resource configuration assistance information may be sent to the first network device through an initial context setup request (initial context setup request) message or a handover request (Handover request) message. Alternatively, that the first network device may further receive resource configuration assistance information reported by the user equipment may specifically include reporting, by the user equipment, the assistance information (assistance info) to the first network device, where the assistance information includes the resource configuration assistance information. Therefore, a manner in which the first network device receives the resource configuration assistance information is not specifically limited herein.

In addition, in this embodiment of this application, the resource configuration assistance information may be provided for one user equipment or one group of user equipments, and the user equipment may be a device that is fixed at one position since deployment, for example, an intelligent water meter, an intelligent electricity meter, or a monitor. Alternatively, the user equipment may be a device that has a very small moving range and that usually does not change a serving cell thereof. For example, an electrical appliance and the like in a smart home are usually not moved out of a room and are limited to move inside the room. The user equipment may alternatively be a device that is stationary for a fairly long time. For example, in location tracking of an express parcel, a positioning device stays stationary when the express parcel is in a warehouse. Therefore, a specific application scenario of the user equipment in real life is not limited in this application.

102. The first network device sends dedicated resource configuration information to the user equipment based on the resource configuration assistance information.

After receiving the resource configuration assistance information, the first network device configures the dedicated resource configuration information for the user equipment based on the communication pattern of the user equipment indicated by the resource configuration assistance information. The dedicated resource configuration information is used by the user equipment in an RRC non-connected state to access the first network device again, and the RRC non-connected state may include an RRC idle state or an RRC inactive state. That is, during an RRC connected state or an RRC connection release process, the first network device configures, for the user equipment, the dedicated resource configuration information used by the user equipment when the user equipment accesses the first network device next time. In a first case, the RRC idle state is an RRC IDLE mode. In this case, no connection related to the user equipment exists between the user equipment and the first network device, between the first network device and the MME, or between the first network device and the S-GW. In a second case, the RRC idle state is an RRC suspend state, that is, RRC suspend. In this case, no connection related to the user equipment exists between the user equipment and the first network device, between the first network device and the MME, or between the first network device and the S-GW, but context information of the user equipment is stored on the user equipment, the first network device, and/or the MME. The RRC inactive state is RRC inactive. In this case, no connection related to the user equipment exists between the user equipment and the first network device, but the context information of the user equipment is stored on the user equipment and/or the first network device, and connections related to the user equipment exist between the first network device and the MME and between the first network device and the S-GW.

In addition, the accessing the first network device by the user equipment in the RRC non-connected state is initiating a random access procedure by the user equipment in the RRC non-connected state to the first network device, or sending user plane data to the first network device, or an interaction process between other user equipment and the first network device.

It should be noted that, in this embodiment, a content of the dedicated resource configuration information may include the following cases:

Case 1: an uplink parameter and/or a downlink parameter.

The uplink parameter includes a first resource, the first resource is used by the user equipment to request an uplink resource from the first network device, and the first resource may include: a dedicated random access preamble for the user equipment; or a dedicated random access time-frequency resource for the user equipment; or a scheduling request SR resource.

Optionally, the uplink parameter may further include a validity time of the first resource and/or indication information, where the indication information is used to indicate service data volume information; and/or the downlink parameter includes a second resource, the second resource is used by the user equipment to monitor downlink data, and the second resource may include a dedicated radio network temporary identifier RNTI for the user equipment, where the dedicated RNTI is used by the user equipment to monitor the downlink data.

Optionally, the downlink parameter may further include a validity time of the second resource.

In this specification, the validity time is used to indicate a time during which a corresponding resource can be used by the user equipment, and the user equipment cannot use the resource corresponding to the validity time outside the validity time.

Case 2: uplink resource scheduling information and/or downlink resource scheduling information.

The uplink resource scheduling information is used by the user equipment to send uplink data to the first network device, so that the first network device receives, by using the uplink resource scheduling information, the uplink data sent by the user equipment; and/or the downlink resource scheduling information is used by the first network device to send downlink data to the user equipment, so that the first network device sends the downlink data to the user equipment by using the downlink resource scheduling information.

103. The first network device and the user equipment perform data transmission with each other by using the dedicated resource configuration information.

After the user equipment receives the dedicated resource configuration information sent by the first network device, that the first network device and the user equipment perform data transmission based on the dedicated resource configuration information includes: sending, by the user equipment, the uplink data to the first network device and/or sending, by the first network device, the downlink data to the user equipment.

In this embodiment of this application, the user equipment in the RRC non-connected state accesses the first network device through a dedicated access resource configured by the first network device, and the user equipment can further send the uplink data to the first network device on the specified resource configured by the first network device, to reduce a latency of accessing a network by the user equipment and power consumption during the process of accessing the network by the user equipment.

For ease of understanding, two possible cases about the content of the foregoing dedicated resource configuration information are described below with reference to specific embodiments.

Figure 2A:
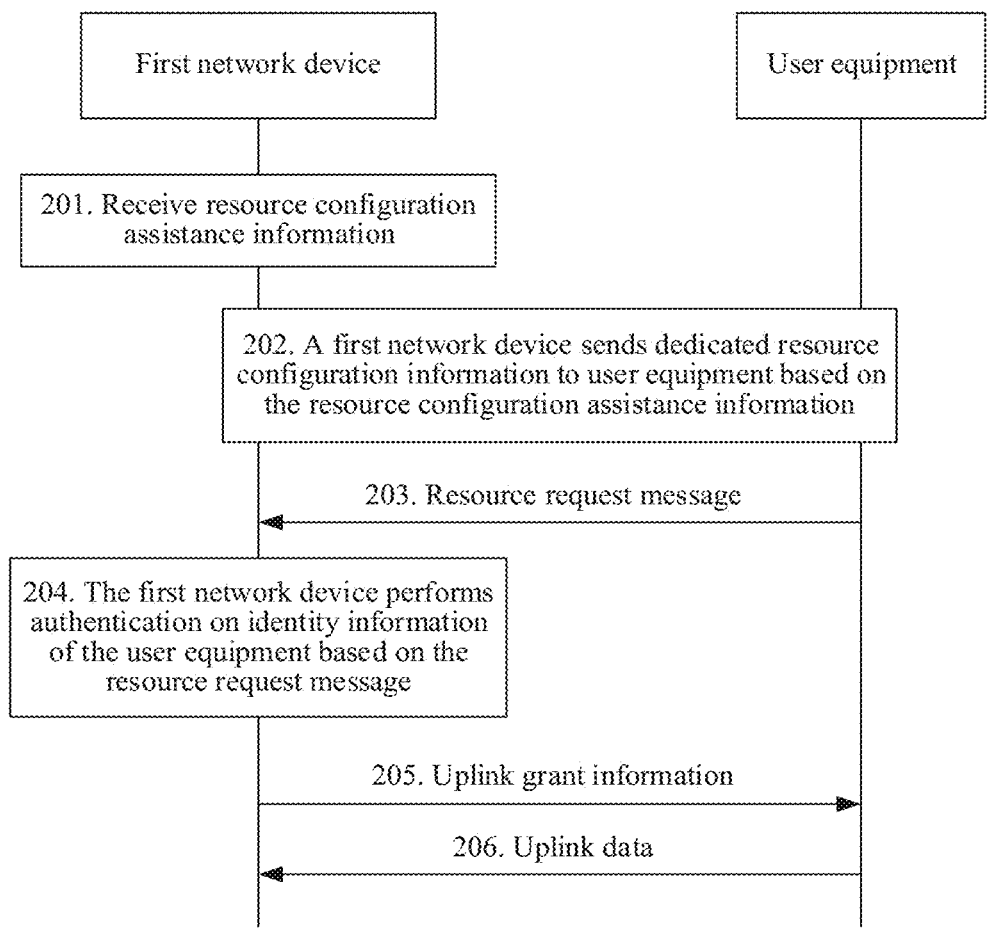
FIG. 2A is a schematic diagram of an embodiment of another possible data transmission method according to an embodiment of this application.

FIG. 2A is a flowchart of a resource configuration method according to an embodiment of this application when a content of dedicated resource configuration information meets Case 1. The method includes the following steps.

201. A first network device receives resource configuration assistance information.

In this embodiment, step S201 is similar to step S101 shown in FIG. 1C, and details are not described herein again.

202. The first network device sends dedicated resource configuration information to user equipment based on the resource configuration assistance information.

After receiving the resource configuration assistance information, the first network device configures the dedicated resource configuration information for the user equipment based on the communication pattern of the user equipment indicated by the resource configuration assistance information in a validity time. The dedicated resource configuration information is used by the user equipment in an RRC non-connected state to access the first network device again. The RRC non-connected state may include an RRC idle state or an RRC inactive state, and the dedicated resource configuration information may include an uplink parameter and/or a downlink parameter.

Specifically, the uplink parameter in the dedicated resource configuration information includes a first resource, and the first resource is used by the user equipment to request an uplink resource from the first network device. The first resource may include: (1) a dedicated random access preamble (Dedicated Preamble) for the user equipment; or (2) a dedicated random access time-frequency resource (Dedicated PRACH resource) for the user equipment; or (3) a scheduling request (Scheduling request, SR) resource.

Optionally, the uplink parameter may further include a validity time (Validity time) of the first resource. Therefore, the validity time corresponding to the first resource may include: (1) a validity time of the dedicated random access preamble for the user equipment, referred to as a first validity time in this application for ease of description; (2) a validity time of the dedicated random access time-frequency resource for the user equipment, similarly, referred to as a second validity time in this application; and (3) a validity time of the SR resource, similarly, referred to as a third validity time in this application.

Optionally, the uplink parameter may further include indication information, and the indication information is used to indicate service data volume information corresponding to the foregoing validity times. Therefore, in this application, indication information corresponding to the first validity time is referred to as first indication information, indication information corresponding to the second validity time is referred to as second indication information, and indication information corresponding to the third validity time is referred to as third indication information.

For ease of understanding, parameters of respective parts that may be included in the uplink parameter are described below in detail.

(1) Dedicated Random Access Preamble (Dedicated Preamble) for the User Equipment Optionally, the dedicated random access preamble for the user equipment may be configured by using a parameter ra-PreambleIndex, and a range of ra-PreambleIndex is (0 to 63), that is, corresponding to 64 Preamble bits.

Figure 2B:
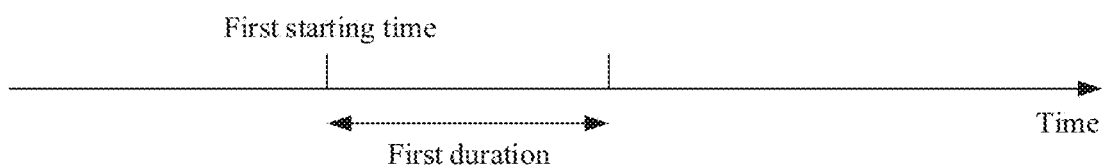
FIG. 2B is a diagram of an example of a possible data transmission method according to an embodiment of this application.
Figure 2C:
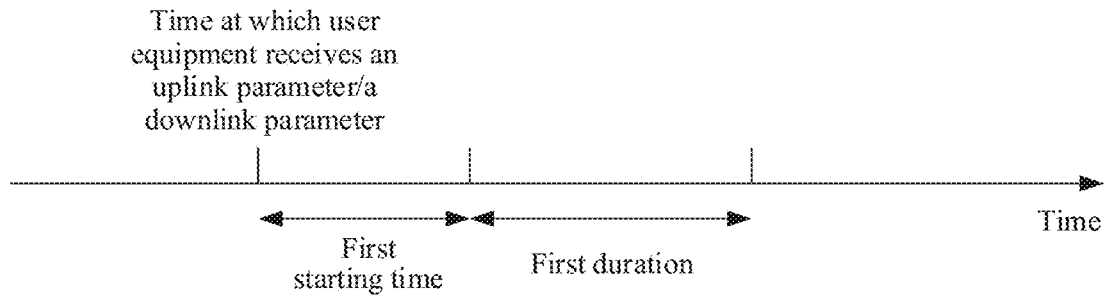
FIG. 2C is a diagram of an example of another possible data transmission method according to an embodiment of this application.

Optionally, when the first parameter further includes the first validity time, the first validity time includes first duration information and/or first starting time information. The first duration information is duration during which the user equipment can use the dedicated random access preamble for the user equipment, and outside the duration, the user equipment cannot use the dedicated random access preamble for the user equipment. The first starting time information indicates a time at which the user equipment is allowed to start to use the dedicated random access preamble. The first starting time may be an absolute time or a relative time. For example, refer to FIG. 2B for ease of understanding. As shown in FIG. 2B, the first starting time is an absolute time, for example, the $N^{th}$ subframe or the $N^{th}$ system frame. Alternatively, as shown in FIG. 2C, the first starting time is a relative time, for example, a time relative to a time at which the user equipment receives the uplink/downlink parameter. After the first starting time, the user equipment can use the dedicated random access preamble for the user equipment. A reference time for the first starting time herein may alternatively be another moment, and this is not specifically limited herein.

Optionally, when the first parameter further includes the first indication information, the first indication information is used to indicate the service data volume information corresponding to the foregoing first validity time. For example, the first network device configures a plurality of first validity times for the user equipment, and different first validity times correspond to different data volumes. For example, a particular first validity time 01:00:00-01:00:59 corresponds to a service with 20 bytes of data, and another first validity time 01:01:00-01:01:59 corresponds to a service with 50 bytes of data. Alternatively, the first network device configures, for the user equipment, a plurality of dedicated random access preambles for the user equipment, and different dedicated random access preambles for the user equipment correspond to services with different data volumes. In this way, the first network device can determine, based on the first validity time or the dedicated random access preamble for the user equipment, a data volume of data sent by the user equipment, so that the first network device can allocate resources properly to avoid problems of waste caused by excessive resource allocation and shortage caused by an excessively small quantity of resources. Alternatively, the first indication information indicates whether data volumes of services corresponding to the plurality of first validity times or the plurality of dedicated random access preambles for the user equipment are variable or fixed. For a fixed data volume, the first network device can allocate enough resources at a time, so that the user equipment can send the data at a time. However, for a variable data volume, because the first network device is unaware of the data volume of the data to be sent by the user equipment, the first network device may need to establish an RRC connection with the user equipment, and the data of the user equipment is sent through multiple transmissions.

(2) Dedicated Random Access Time-Frequency Resource (Dedicated PRACH Resource) for the User Equipment Optionally, the dedicated random access time-frequency resource for the user equipment may be configured by using a parameter ra-PRACH-MaskIndex having a range of (0 to 15), that is, corresponding to 16 resource configuration manners.

For example, as shown in Table 1, the PRACH Mask Index corresponds to ra-PRACH-MaskIndex, and 8 configuration methods are provided below in this embodiment of this application.

TABLE 1

| PRACH Mask Index | Allowed PRACH (FDD) | Allowed PRACH (TDD) |
|---|---|---|
| 0 | All | All |
| 1 | PRACH Resource Index 0 | PRACH Resource Index 0 |
| 2 | PRACH Resource Index 1 | PRACH Resource Index 1 |
| 3 | PRACH Resource Index 2 | PRACH Resource Index 2 |
| 4 | PRACH Resource Index 3 | PRACH Resource Index 3 |
| 5 | PRACH Resource Index 4 | PRACH Resource Index 4 |
| 6 | PRACH Resource Index 5 | PRACH Resource Index 5 |
| 7 | PRACH Resource Index 6 | Reserved |

When the PRACH Mask Index is "0", it indicates that all subframes can be used. The PRACH Mask Indexes "1" to "7" respectively correspond to the PRACH Resource Indexes 0 to 6, and configurations thereof are shown in Table 2. The PRACH Resource Index corresponds to the PRACH Configuration Index in Table 2. For ease of understanding, an example that the PRACH Configuration Index=0 in Table 2 is used. In this configuration, format 0 in 4 formats is used for the preamble Preamble, a resource of the PRACH is subframe "1" of even-numbered system frames in time domain, and the user equipment makes a random selection in frequency domain.

TABLE 2

| PRACH Configuration Index | Preamble Format | System Frame Number | Subframe Number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |

Alternatively, the dedicated random access time-frequency resource for the user equipment may be configured by using prach-ConfigIndex and prach-FreqOffset, where prach-ConfigIndex is the PRACH Configuration Index in the table above, and is used to determine a time domain position of a resource, and prach-FreqOffset is used to indicate a frequency domain position of a resource.

Optionally, the uplink parameter further includes a validity time of the dedicated random access time-frequency resource for the user equipment, that is, the second validity time. Use of the second validity time and information included in the second validity time are respectively similar to use of the foregoing first validity time and information included in the first validity time, and details are not described herein again.

Optionally, the uplink parameter may further include the second indication information, and the second indication information is used to indicate service data volume information corresponding to the second validity time. For example, a particular second validity time 01:00:00-01:00:59 corresponds to a service with 20 bytes of data, and another second validity time 01:01:00-01:01:59 corresponds to a service with 50 bytes of data. Alternatively, within a same validity time, a plurality of dedicated random access resources are configured for the user equipment, and different dedicated random access resources for the user equipment correspond to services with different data volumes. In this way, the first network device can determine, based on the second validity time or the dedicated random access resource for the user equipment, a data volume of data sent by the user equipment, so that the first network device can allocate resources properly to avoid problems of waste caused by excessive resource allocation and shortage caused by an excessively small quantity of resources. Alternatively, the second indication information indicates whether data volumes of services corresponding to the plurality of second validity times or the plurality of dedicated random access resources for the user equipment are variable or fixed. For a fixed data volume, the first network device can allocate enough resources at a time, so that the user equipment can send the data at a time. For a variable data volume, because the first network device is unaware of the data volume of the data to be sent by the user equipment, the first network device may need to establish an RRC connection with the user equipment, and the data of the user equipment is completely sent through multiple transmissions.

(3) Scheduling Request (Scheduling Request, SR) Resource.

The SR resource includes an SR resource time domain position and an SR resource frequency domain position. Optionally, the SR resource frequency domain position is configured by using sr-PUCCH-ResourceIndex having a range of (0 to 2047), that is, corresponding to 2048 frequency domain positions. The SR resource time domain position is configured by using sr-ConfigIndex having a range of (0 to 157), that is, corresponding to 158 time domain positions. Configurations corresponding to the indexes are shown in Table 3.

TABLE 3

| SR Configuration Index $I_{SR}$ | SR Periodicity (ms) $SR_{PERIODICITY}$ | SR Subframe Offset $N_{OFFSET,SR}$ |
|---|---|---|
| 0 to 4 | 5 | $I_{SR}$ |
| 5 to 14 | 10 | $I_{SR}$-5 |
| 15 to 34 | 20 | $I_{SR}$-15 |
| 35 to 74 | 40 | $I_{SR}$-35 |
| 75 to 154 | 80 | $I_{SR}$-75 |
| 155 and 156 | 2 | $I_{SR}$-155 |
| 157 | 1 | $I_{SR}$-157 |

For ease of understanding, for example, when sr-ConfigIndex, that is, the SR configuration Index ISR, is set to 50, the corresponding SR period SR periodicity ($SR_{PERIODICITY}$) is 40 ms, and the SR subframe offset SR subframe offset ($N_{OFFSET,SR}$) is 50-35=15. A time domain position of the SR may satisfy the following formula 1:

$$(10 \times n_f + n_{sf} - N_{OFFSET,SR}) \bmod SR_{PERIODICITY} = 0$$

$n_f$ is a system frame number having a range of (0 to 1023), that is, corresponding to 1024 system frame numbers. $n_{sf}$ is a subframe number having a range of (0 to 9), that is, corresponding to 10 subframe numbers. One system frame includes 10 subframes. Mod is a remainder function. When sr-ConfigIndex is set to 50, a corresponding SR period SR periodicity ($SR_{PERIODCITY}$) of 40 ms and an SR subframe offset SR subframe offset ($N_{OFFSETER,SR}$) of 15 are substituted into the foregoing formula 1, to obtain:

$(10 \times n_f + n_{sf} - 15) \bmod 40 = 0$, that is, the time domain position of the SR appears at:

| $n_f$ | $n_{sf}$ |
|---|---|
| 1 | 5 |
| 5 | 5 |
| 9 | 5 |
| ... | | namely, the subframe 5 in system frames 1, 5, 9, 13 . . . .

Optionally, the uplink parameter further includes a validity time of the SR resource, that is, the third validity time. Use of the third validity time and information included in the third validity time are similar to use of the foregoing first validity time and information included in the first validity time, and details are not described herein again.

Optionally, the uplink parameter may further include the third indication information, and the third indication information is used to indicate service data volume information corresponding to the third validity time. For example, a particular third validity time 01:00:00-01:00:59 corresponds to a service with 20 bytes of data, and another third validity time 01:01:00-01:01:59 corresponds to a service with 50 bytes of data. Alternatively, within a same validity time, a plurality of dedicated random access resources are configured for the user equipment, and different dedicated random access resources for the user equipment correspond to services with different data volumes. In this way, the first network device can determine, based on the third validity time or the dedicated random access resource for the user equipment, a data volume of data sent by the user equipment, so that the first network device can allocate resources properly to avoid problems of waste caused by excessive resource allocation and shortage caused by an excessively small quantity of resources. Alternatively, the third indication information indicates whether data volumes of services corresponding to the plurality of third validity times or the plurality of dedicated random access resources for the user equipment are variable or fixed. For a fixed data volume, the first network device can allocate enough resources at a time, so that the user equipment can send the data at a time. For a variable data volume, because the first network device is unaware of the data volume of the data to be sent by the user equipment, the first network device may need to establish an RRC connection with the user equipment, and the data of the user equipment is completely sent through multiple transmissions.

Uplink parameters that may be included in the dedicated resource configuration information are described above. Downlink parameters that may be further included in the dedicated resource configuration information may include a second resource, and the second resource includes:

a dedicated radio network temporary identifier (radio network temporary identifier, RNTI) for the user equipment, where the dedicated RNTI for the user equipment is used by the user equipment in the RRC non-connected state to monitor physical downlink control information, to receive downlink data.

Optionally, the dedicated RNTI for the user equipment may be a dedicated cell radio network temporary identifier (cell radio network temporary identifier. C-RNTI), or a newly defined RNTI, used to monitor, in the RRC non-connected state, a physical downlink control channel (Physical Downlink Control Channel, PDCCH), an enhanced physical downlink control channel (Enhanced Physical Downlink Control Channel, EPDCCH), or an MPDCCH, to receive the downlink data.

Optionally, the downlink parameter may further include a validity time of the second resource. Therefore, the validity time corresponding to the second resource may include: a validity time of the dedicated C-RNTI or a validity time of the newly defined RNTI, so that the user equipment monitors the downlink data by using the dedicated C-RNTI or the newly defined RNTI in the validity time.

Optionally, the dedicated resource configuration information may further include a suspend indication information, and the suspend indication information is used to instruct the user equipment to enter the RRC non-connected state and save the context information of the user equipment.

After configuring the dedicated resource configuration information, the first network device sends the dedicated resource configuration information to the user equipment through an upper-layer message. The upper-layer message may be a radio resource control (radio resource control, RRC) connection reconfiguration (RRC connection reconfiguration) message, or an RRC connection release (RRC connection release) message, or the like, and this is not specifically limited herein.

203. The user equipment sends a resource request message to the first network device.

After receiving the dedicated resource configuration information configured by the first network device, when there is uplink data (uplink data, UL data) that needs to be sent, the user equipment sends the resource request message to the first network device based on the uplink parameter in the dedicated resource configuration information, and the resource request message is used to request the first network device to allocate an uplink resource to the user equipment. There are multiple manners for the user equipment to send the resource request message to the first network device based on the uplink parameter. In actual application, based on different information included in the first resource in the uplink parameter, the manners may be classified as follows:

(1) The First Resource in the Uplink Parameter Includes a Dedicated Random Access Preamble for the User Equipment.

The user equipment sends the dedicated random access preamble for the user equipment to the first network device by using a randomly selected random access time-frequency resource, and the dedicated random access preamble for the user equipment is included in the resource request message.

Optionally, when the uplink parameter further includes a validity time of the dedicated random access preamble for the user equipment, that is, the first validity time in step 202 in this embodiment, the user equipment may send, in the first validity time, the dedicated random access preamble for the user equipment to the first network device by using a random access time-frequency resource randomly selected by the user equipment, and the dedicated random access preamble for the user equipment is included in the resource request message.

Optionally, when the uplink parameter in the dedicated resource configuration information further includes the first indication information, the user equipment selects a corresponding validity time or a corresponding dedicated random access preamble based on a data volume of the uplink data, and the user equipment sends, in the corresponding validity time, the corresponding dedicated random access preamble to the first network device by using the random access time-frequency resource randomly selected by the user equipment. The dedicated random access preamble for the user equipment is included in the resource request message.

(2) The First Resource in the Uplink Parameter Includes a Dedicated Random Access Time-Frequency Resource for the User Equipment.

The user equipment sends the random access preamble randomly selected by the user equipment to the first network device by using the dedicated random access time-frequency resource for the user equipment, and the randomly selected random access preamble is included in the resource request message.

Optionally, when the uplink parameter further includes a validity time of the dedicated random access time-frequency resource for the user equipment, that is, the second validity time in step 202 in this embodiment, the user equipment may send, in the second validity time, the random access preamble randomly selected by the user equipment to the first network device by using the dedicated random access time-frequency resource, and the random access preamble is included in the resource request message.

Optionally, when the uplink parameter further includes the second indication information, the user equipment selects a corresponding validity time or a corresponding dedicated random access time-frequency resource based on a data volume of the uplink data, and the user equipment sends, in the corresponding validity time, the random access preamble randomly selected by the user equipment to the first network device by using the corresponding dedicated random access time-frequency resource. The random access preamble is included in the resource request message.

(3) The Uplink Parameter Includes an SR Resource.

The user equipment sends an SR to the first network device by using the SR resource configured by the first network device, and the SR is included in the resource request message.

Optionally, when the uplink parameter further includes a validity time of the SR resource, the user equipment may send, in the validity time of the SR resource, an SR to the first network device by using the SR resource configured by the first network device, and the SR is included in the resource request message.

Optionally, when the uplink parameter further includes the third indication information, the user equipment selects a corresponding validity time or a corresponding SR resource based on a data volume of the uplink data, and the user equipment sends, in the corresponding validity time, an SR to the first network device by using the corresponding SR resource. The SR is included in the resource request message.

Based on the above, there are a plurality of manners for the user equipment to send an access resource request message to the first network device based on the uplink parameter, and this is not specifically limited herein.

204. The first network device performs authentication on identity information of the user equipment based on the resource request message.

This step is an optional step.

After receiving the resource request message sent by the user equipment, the first network device performs authentication on the identity information of the user equipment based on the first resource used by the resource request message. The identity information includes the identifier of the user equipment or the context information of the user equipment.

Specifically, (1) when the first resource in the uplink parameter includes the dedicated random access preamble for the user equipment, and the resource request message includes the dedicated random access preamble for the user equipment, the first network device obtains the identity information of the user equipment based on a mapping relationship preset for the dedicated random access preamble for the user equipment. The preset mapping relationship may be shown in Table 4. For example, assuming that a dedicated random access preamble for the user equipment is Preamble3, the first network device determines that the identifier of the user equipment is 102, and/or determines the context information of the user equipment.

TABLE 4

|  |  | UE1 | UE2 | UE3 |
|---|---|---|---|---|
| UE identifier |  | 101 | 102 | 103 |
| Uplink parameter | Preamble | Preamble1 | Preamble3 | Preamble7 |
|  | Validity time | 7 min | 2 min | 3 min |
|  | Random access time-frequency resource | 2 PRBs | 1 PRB | 3 PRBs |
|  | Validity time | 3 min | 4 min | 8 min |
| Downlink parameter | RNTI | 238 | 342 | 784 |
|  | Validity time | 4 seconds | 2 seconds | 1 second |

Alternatively, after receiving, in a first time, the resource request message sent by the user equipment, the first network device performs authentication on the identity information of the user equipment based on the first resource used by the resource request message and the first time. The identity information includes the identifier of the user equipment or the context information of the user equipment.

Specifically, when the uplink parameter includes the dedicated random access preamble for the user equipment and the validity time of the dedicated random access preamble, that is, the first validity time, and the resource request message includes the dedicated random access preamble for the user equipment, the first network device determines that the first time falls within the first validity time, and obtains the identity information of the user equipment based on a mapping relationship preset for the dedicated random access preamble for the user equipment. The preset mapping relationship may be shown in Table 4. For example, assuming that the dedicated random access preamble for the user equipment is Preamble3, and a time during which the first network device receives the dedicated random access preamble, that is, the first time, falls within the validity time, the first network device determines that the identifier of the user equipment is 102, and/or determines the context information of the user equipment.

Based on the foregoing two cases, optionally, if the uplink parameter further includes the first indication information, the first network device determines service data volume information of the user equipment based on the first indication information, specifically including determining a size of a service data volume or determining whether the service data volume is variable or fixed.

(2) When the uplink parameter includes the dedicated random access time-frequency resource for the user equipment, the resource request message includes a random access preamble randomly selected by the user equipment, and a time-frequency resource used by the user equipment to send the random access preamble is the dedicated random access time-frequency resource for the user equipment, the first network device obtains the identity information of the user equipment based on a mapping relationship preset for the dedicated random access time-frequency resource for the user equipment.

When the uplink parameter includes the dedicated random access time-frequency resource for the user equipment and a validity time of the dedicated random access time-frequency resource, that is, the second validity time, the resource request message includes a random access preamble randomly selected by the user equipment, and a time-frequency resource used by the user equipment to send the random access preamble is the dedicated random access time-frequency resource for the user equipment, the first network device determines that the first time falls within the second validity time, and obtains the identity information of the user equipment based on the mapping relationship preset for the dedicated random access time-frequency resource for the user equipment.

Based on the foregoing two cases, optionally, if the uplink parameter further includes the second indication information, the first network device determines service data volume information of the user equipment based on the second indication information, specifically including determining a size of a service data volume or determining whether the service data volume is variable or fixed.

(3) When the uplink parameter includes the SR resource, and the resource request message includes the SR, the first network device determines the identity information of the user equipment based on the SR resource used by the user equipment to send the SR; or when the uplink parameter includes the SR resource and a validity time of the SR resource, that is, the third validity time, and the resource request message includes the SR, the first network device determines that the first time falls within the third validity time, and determines the identity information of the user equipment based on the SR resource used by the user equipment to send the SR.

Based on the foregoing two cases, optionally, if the uplink parameter further includes the third indication information, the first network device determines service data volume information of the user equipment based on the third indication information, specifically including determining a size of a service data volume or determining whether the service data volume is variable or fixed.

Therefore, in actual application, there are a plurality of manners in which the first network device performs authentication on the identity information of the user equipment, and this is not specifically limited herein.

205. The first network device sends uplink grant information to the user equipment.

After authenticating the identity information of the user equipment, the first network device sends the uplink grant information to the user equipment. In this case, if the first network device does not activate the context information of the user equipment, the first network device reads the context information of the user equipment, and activates a configuration of the user equipment. The uplink grant information is used to indicate an uplink resource used by the user equipment to send uplink data, and may specifically include: sending a UL grant corresponding to the user equipment. The UL grant may carry predetermined information that can be uniquely identified by the user equipment, a dedicated resource specified for the user equipment to send the uplink data, and scheduling information such as a modulation and coding scheme (modulation and coding scheme, MCS), so that the user equipment can identify the UL grant of the user equipment through blind-detection based on the predetermined information, and send the uplink data on the dedicated resource specified in the UL grant.

Optionally, in actual application, the configuration information may be a random access response (Random Access Response, RAR) message or an RRC connection resume (RRC connection resume) message, or may be another existing message or a new message, and this is not specifically limited herein.

Optionally, if the network side does not activate the context information of the user equipment, the first network device sends a request message to a second network device, to request the second network device to activate the context of the user equipment.

206. The user equipment sends the uplink data to the first network device.

After receiving the uplink grant information sent by the first network device, the user equipment receives the UL grant. If the user equipment does not activate the context information of the user equipment, the user equipment activates the context information, and transmits the uplink data to the first network device by using the activated context information and the uplink resource indicated by the UL grant.

In this embodiment of this application, the user equipment in the RRC non-connected state accesses the first network device through a dedicated access resource configured by the first network device, and the user equipment can further send the uplink data to the first network device on the specified resource configured by the first network device, thereby reducing a latency of accessing a network by the user equipment and power consumption during the process of accessing the network by the user equipment.

In addition, this embodiment of this application further provides a manner of reporting the resource configuration assistance information by the user equipment, that is, providing the scheduled resource configuration assistance information for the first network device through interaction between the user equipment and the first network device, to configure a dedicated access resource for the user equipment, thereby reducing interaction information on a network-side node.

Figure 2D:
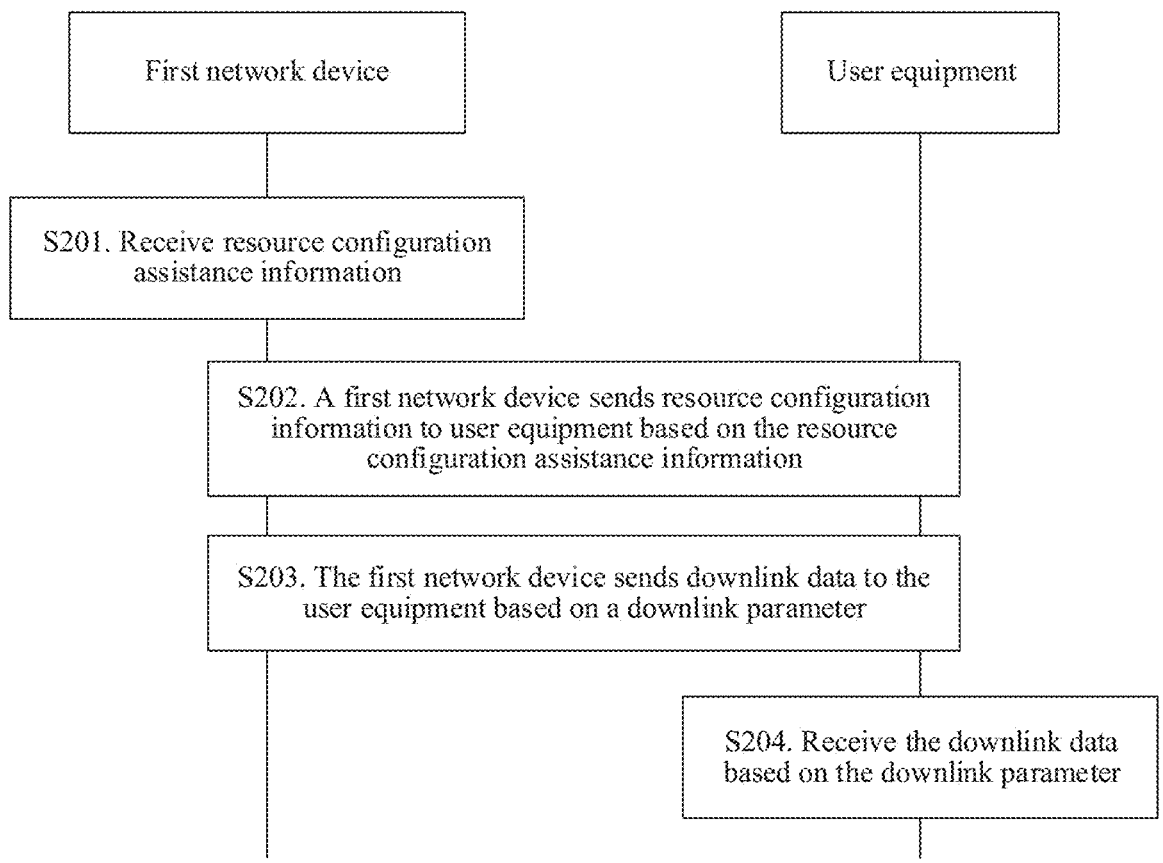
FIG. 2D is a schematic diagram of an embodiment of another possible data transmission method according to an embodiment of this application.

In addition, FIG. 2A provides manners of uplink data transmission performed by the first network device and the user equipment by using the dedicated resource configuration information when the dedicated resource configuration information includes the uplink parameter and/or the downlink parameter, and the user equipment needs to send the uplink data. In actual application, a scenario in which the first network device sends the downlink data to the user equipment also exists. In view of this, this application further provides a resource configuration method. FIG. 2D is another flowchart of a resource configuration method provided based on the foregoing Case 1 in this application. The method includes the following steps.

S201. A first network device receives resource configuration assistance information.

S202. The first network device sends dedicated resource configuration information to user equipment based on the resource configuration assistance information.

In this embodiment of this application, step S201 and step S202 are similar to step 201 and step 202 shown in FIG. 2A, and details are not described herein again.

S203. The first network device sends downlink data to the user equipment based on a downlink parameter.

After receiving the downlink data (downlink data, DL data) sent by a serving gateway (service gateway, S-GW), the first network device sends the downlink data to the user equipment based on the downlink parameter configured for the user equipment in the dedicated resource configuration information. The downlink parameter includes a second resource, and the second resource includes a dedicated RNTI for the user equipment. The dedicated RNTI for the user equipment may be a dedicated C-RNTI or a newly defined RNTI. Specifically, the first network device schedules the downlink data to the user equipment by using a PDCCH scrambled by using the dedicated C-RNTI for the user equipment or the newly defined RNTI. Alternatively, the first network device scrambles the downlink data by using the dedicated C-RNTI for the user equipment or the newly defined RNTI, and sends the scrambled downlink data to the user equipment.

S204. The user equipment receives the downlink data based on the downlink parameter.

The user equipment receives the downlink data sent by the first network device, and the downlink data is obtained by scrambling by a base station based on the dedicated RNTI for the user equipment or the newly defined RNTI.

Optionally, if the downlink parameter further includes a validity time of the second resource, that is, within a validity time of the dedicated C-RNTI or the newly defined RNTI, the user equipment monitors a physical downlink control channel by using the dedicated C-RNTI or the newly defined RNTI.

In this embodiment of this application, the first network device configures the dedicated access resource for the user equipment, and directly schedules the downlink data to the user equipment by configuring the downlink-dedicated C-RNTI or the newly defined RNTI by the first network device, thereby reducing a time for the user equipment to access the network.

FIG. 2A includes a process in which the first network device and the user equipment perform uplink data transmission by using the dedicated resource configuration information when a content of the dedicated resource configuration information meets Case 1, and the dedicated resource configuration information includes the uplink parameter; and FIG. 2D includes a process in which the first network device and the user equipment perform downlink data transmission by using the dedicated resource configuration information when the content of the dedicated resource configuration information meets Case 1, and the dedicated resource configuration information includes the downlink parameter.

It should be noted that the first network device and the user equipment perform data transmission by using the dedicated resource configuration information, including: sending, by the first network device, the downlink data to the user equipment and sending, by the user equipment, the uplink data to the first network device. There is no sequence of steps between the two processes. That is, the process of sending, by the first network device, the downlink data to the user equipment may be performed first, or the process of sending, by the user equipment, the uplink data to the first network device may be performed first, and this is not specifically limited in this application.

Figure 3A:
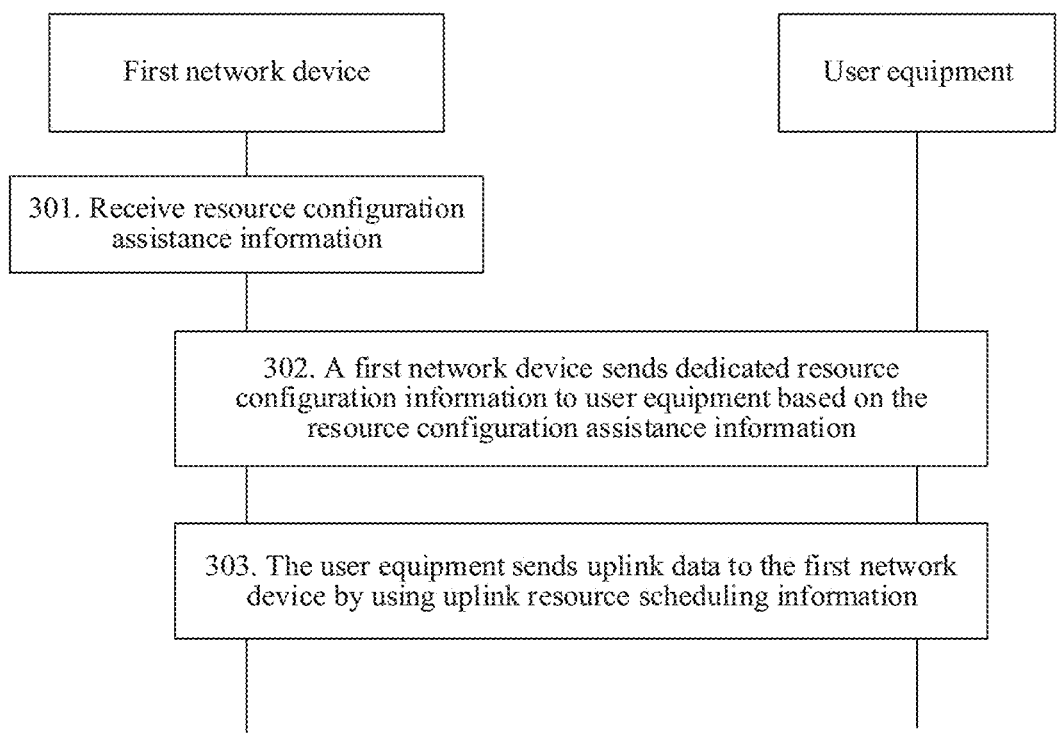
FIG. 3A is a schematic diagram of an embodiment of another possible data transmission method according to an embodiment of this application.

FIG. 3A is a flowchart of a resource configuration method according to an embodiment of this application when a content of dedicated resource configuration information meets Case 2. The method includes the following steps.

301. A first network device receives resource configuration assistance information.

In this embodiment, step 301 is similar to step 101 shown in FIG. 1C, and details are not described herein again.

302. The first network device sends dedicated resource configuration information to user equipment based on the resource configuration assistance information.

After receiving the resource configuration assistance information, in a validity time associated with the resource configuration assistance information, the first network device configures the dedicated resource configuration information for the user equipment based on the communication pattern of the user equipment indicated by the resource configuration assistance information. The dedicated resource configuration information is used by the user equipment in an RRC non-connected state to access the first network device again. The RRC non-connected state may include an RRC idle state or an RRC inactive state.

Specifically, the dedicated resource configuration information may include uplink resource scheduling information and/or downlink resource scheduling information. The uplink resource scheduling information is used by the user equipment to send uplink data to the first network device, and can indicate, to the user equipment, a position of a radio resource used to send the uplink data. The uplink resource scheduling information may include one or more pieces of the following information: a resource block index (resource block index, RB index), an RB position, a modulation and coding scheme (Modulation and Coding Scheme. MCS), and a resource scheduling period; and/or the downlink resource scheduling information is used by the first network device to send downlink data to the user equipment, and can indicate, to the user equipment, a position of a radio resource used to send the downlink data by the first network device. The downlink resource scheduling information may include one or more pieces of the following information: a resource block index (resource block index, RB index), an RB position, a modulation and coding scheme (Modulation and Coding Scheme, MCS), and a resource scheduling period.

303. The user equipment sends the uplink data to the first network device by using the uplink resource scheduling information.

After receiving the dedicated resource configuration information, the user equipment determines, through the uplink resource scheduling information in the dedicated resource configuration information, a first radio resource configured by the first network device, and sends the uplink data to the first network device by using the first radio resource.

Figure 3B:
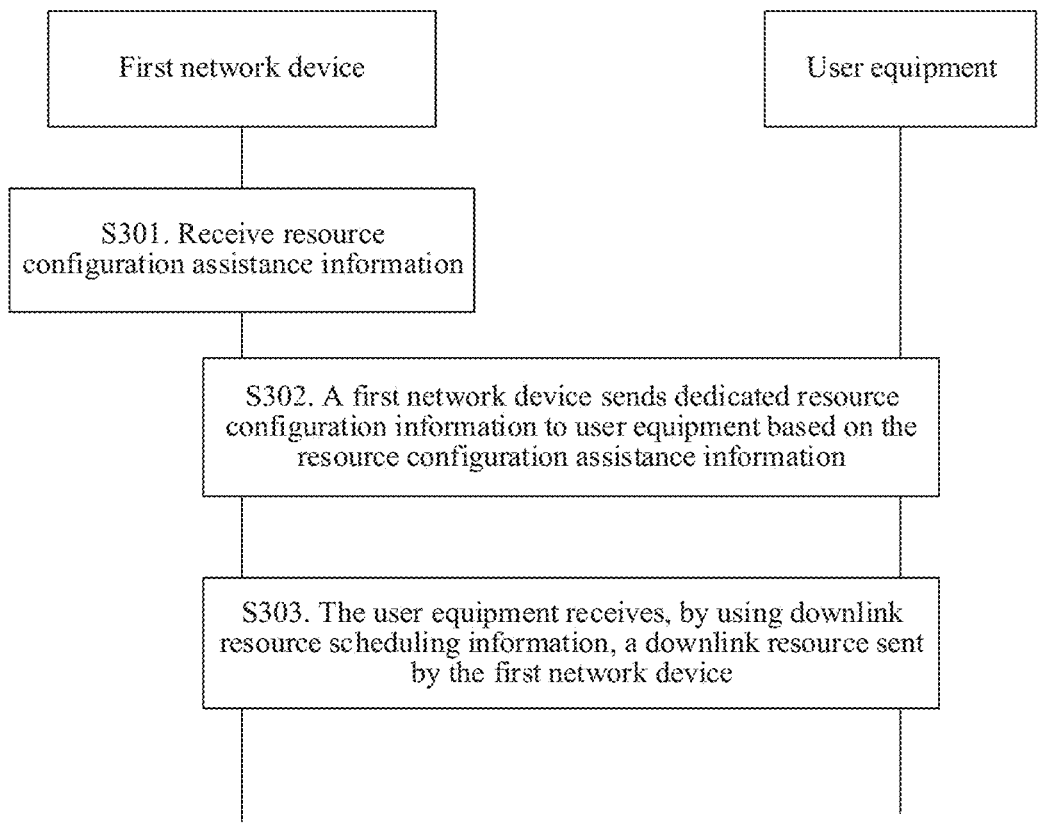
FIG. 3B is a schematic diagram of an embodiment of another possible data transmission method according to an embodiment of this application.

Similarly, because a scenario in which the first network device sends the downlink data to the user equipment may also exist in actual application, this application further provides a resource configuration method. FIG. 3B is another flowchart of a resource configuration method provided based on the foregoing Case 2 in this application. The method includes the following steps.

S301. A first network device receives resource configuration assistance information.

S302. The first network device sends dedicated resource configuration information to user equipment based on the resource configuration assistance information.

In this embodiment, step S301 and step S302 are similar to step 301 and step 302 shown in FIG. 3A, and details are not described herein again.

S303. The user equipment receives, by using downlink resource scheduling information, downlink data sent by the first network device.

After receiving the dedicated resource configuration information, the user equipment determines, through the downlink resource scheduling information in the dedicated resource configuration information, a second radio resource used by the first network device to send the downlink data, and receives the downlink data sent by the first network device by using the second radio resource.

FIG. 3A includes a process in which the first network device and the user equipment perform uplink data transmission by using the dedicated resource configuration information when a content of the dedicated resource configuration information meets Case 2, and the dedicated resource configuration information includes the uplink resource scheduling information; and FIG. 3B includes a process in which the first network device and the user equipment perform downlink data transmission by using the dedicated resource configuration information when the content of the dedicated resource configuration information meets Case 2, and the dedicated resource configuration information includes the downlink resource scheduling information.

Figure 4:
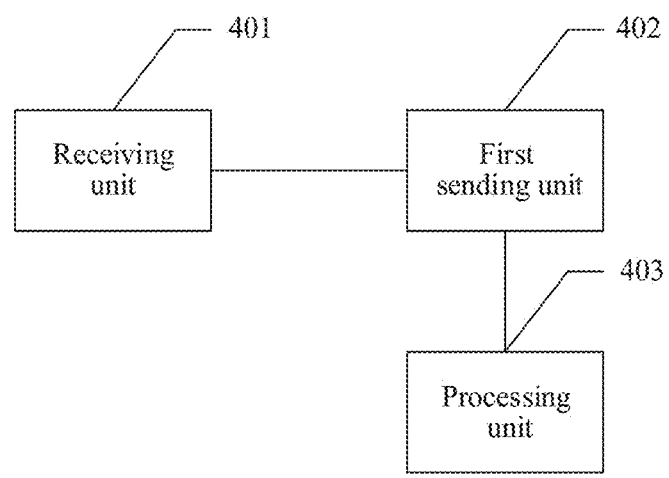
FIG. 4 is a schematic diagram of an embodiment of a possible network device according to an embodiment of this application.

The data transmission methods in the embodiments of this application are described above, and the network device and the user equipment in the embodiments of this application are described below. The network device is the first network device. Referring to FIG. 4, in an embodiment of the network device in this embodiment of this application, the network device includes a receiving unit 401, a first sending unit 402, and a processing unit 403.

The receiving unit 401 is configured to receive resource configuration assistance information, where the resource configuration assistance information is used to indicate a communication pattern of user equipment.

The first sending unit 402 is configured to send dedicated resource configuration information to the user equipment based on the resource configuration assistance information, where the dedicated resource configuration information is used by the user equipment in an RRC non-connected state to access the first network device, and the RRC non-connected state is an RRC idle state or an RRC inactive state.

The processing unit 403 is configured to perform data transmission with the user equipment by using the dedicated resource configuration information.

In this embodiment of this application, the first sending unit receives the resource configuration assistance information from the receiving unit, and sends the dedicated resource configuration information to the user equipment, so that the first network device and the user equipment can perform data transmission by using the dedicated resource configuration information, to reduce a latency and power consumption of accessing a network by the user equipment.

Figure 5:
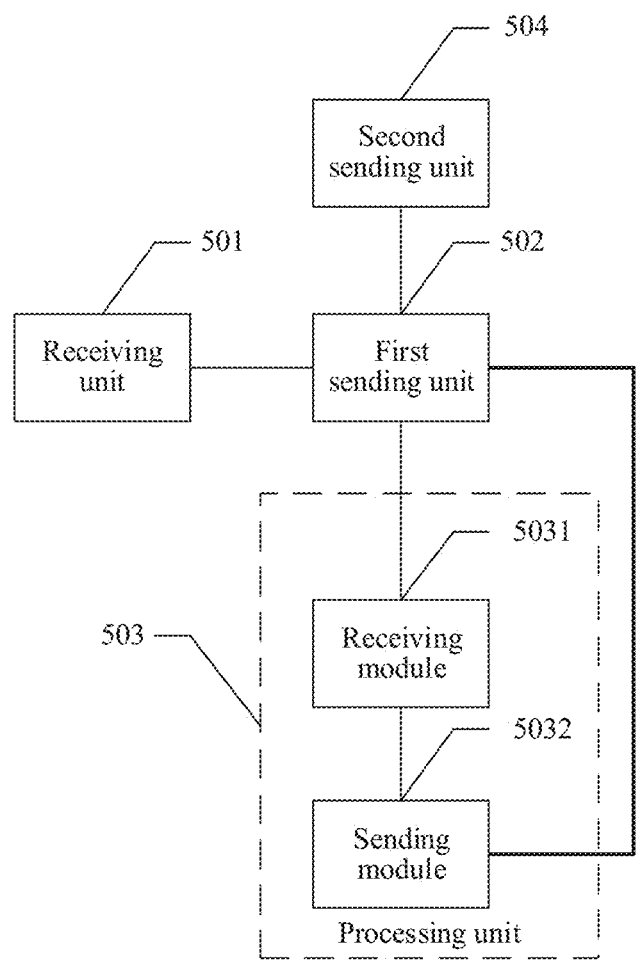
FIG. 5 is a schematic diagram of an embodiment of another possible network device according to an embodiment of this application.

Referring to FIG. 5, in another embodiment of the network device in this embodiment of this application, the network device includes a receiving unit 501, a first sending unit 502, and a processing unit 503.

The receiving unit 501 is configured to receive resource configuration assistance information, where the resource configuration assistance information is used to indicate a communication pattern of user equipment.

The first sending unit 502 is configured to send dedicated resource configuration information to the user equipment based on the resource configuration assistance information, where the dedicated resource configuration information is used by the user equipment in an RRC non-connected state to access the first network device, and the RRC non-connected state is an RRC idle state or an RRC inactive state.

The processing unit 503 is configured to perform data transmission with the user equipment by using the dedicated resource configuration information.

Optionally, in some embodiments, the receiving unit 501 is specifically configured to:

receive the resource configuration assistance information sent by a second network device, where the second network device is a mobility management implementation MME, a home subscriber server HSS, a service capability exposure function unit SCEF, a service capability server SCS, or an application server AS; or receive the resource configuration assistance information sent by the user equipment, where the resource configuration assistance information includes one or more of the following parameters: a periodic communication indicator, communication duration, a communication period, a scheduled communication time, a scheduling starting time, a data volume indication and a stationary indication.

Optionally, in some embodiments, the dedicated resource configuration information includes an uplink parameter and/or a downlink parameter.

The uplink parameter includes a first resource, and the first resource includes:

a dedicated random access preamble for the user equipment; or a dedicated random access time-frequency resource for the user equipment: or a scheduling request SR resource; and/or the downlink parameter includes a second resource, and the second resource includes:

a dedicated radio network temporary identifier RNTI for the user equipment, where the dedicated RNTI is used by the user equipment to monitor downlink data.

Optionally, in some embodiments, the uplink parameter further includes a validity time of the first resource and/or indication information, where the indication information is used to indicate service data volume information.

The downlink parameter further includes a validity time of the second resource.

Optionally, in some embodiments, the processing unit 503 may further include a receiving module 5031 and a sending module 5032.

The receiving module 5031 is configured to receive a resource request message sent by the user equipment based on the dedicated resource configuration information, where the resource request message is used to request the first network device to allocate an uplink resource.

The sending module 5032 is configured to send uplink grant information to the user equipment, where the uplink grant information is used to indicate the uplink resource used by the user equipment to send uplink data.

The receiving module 5031 is further configured to receive, based on the uplink grant information, the uplink data sent by the user equipment.

Optionally, in some embodiments, the receiving module 5031 is specifically configured to:

receive, when the dedicated resource configuration information includes the dedicated random access preamble for the user equipment, the dedicated random access preamble for the user equipment sent by the user equipment, where the dedicated random access preamble for the user equipment is included in the resource request message; or receive, when the dedicated resource configuration information includes the dedicated random access preamble for the user equipment and a validity time of the dedicated random access preamble, in the validity time of the dedicated random access preamble, the dedicated random access preamble for the user equipment sent by the user equipment, where the dedicated random access preamble for the user equipment is included in the resource request message; or receive, when the dedicated resource configuration information includes the dedicated random access time-frequency resource for the user equipment, on the dedicated random access time-frequency resource for the user equipment, a random access preamble sent by the user equipment by using the dedicated random access time-frequency resource for the user equipment, where the random access preamble is included in the resource request message; or receive, when the dedicated resource configuration information includes the dedicated random access time-frequency resource for the user equipment and a validity time of the dedicated random access time-frequency resource, in the validity time of the dedicated random access time-frequency resource, a random access preamble sent by the user equipment by using the dedicated random access time-frequency resource for the user equipment, where the random access preamble is included in the resource request message; or receive, when the dedicated resource configuration information includes the scheduling request SR resource, on the SR resource, an SR sent by the user equipment by using the SR resource, where the SR is included in the resource request message; or receive, when the dedicated resource configuration information includes the scheduling request SR resource and a validity time of the SR resource, in the validity time of the SR resource, an SR sent by the user equipment by using the SR resource, where the SR is included in the resource request message.

Optionally, in some embodiments, the receiving module 5031 is specifically configured to:

receive, when the uplink parameter in the dedicated resource configuration information includes a first resource, on the first resource, the resource request message sent by the user equipment based on the first resource; or receive, by the first network device when the uplink parameter in the dedicated resource configuration information includes a first resource and a validity time of the first resource, on the first resource and in the validity time of the first resource, the resource request message sent by the user equipment based on the first resource and the validity time of the first resource.

Optionally, in some embodiments, the sending module 5032 is specifically configured to:

send, when an uplink parameter in the dedicated resource configuration information further includes indication information, the uplink grant information to the user equipment based on the indication information.

Optionally, in some embodiments, the network device may further include a second sending unit 504.

The second sending unit 504 is configured to request, when the first network device or the second network device does not activate context information of a terminal, the second network device to activate the context information of the terminal.

Optionally, in some embodiments, the sending module 5032 may further be configured to:

send, by the first network device when the dedicated resource configuration information includes the dedicated RNTI for the user equipment, downlink data to the user equipment by using the dedicated RNTI for the user equipment; or send, when the dedicated resource configuration information includes the dedicated RNTI for the user equipment and a validity time of the dedicated RNTI, downlink data to the user equipment by using a dedicated radio network temporary identifier RNTI for the user equipment in the validity time of the dedicated RNTI.

In this embodiment of this application, a manner of sending the dedicated resource configuration information by the first network device and processes of respectively performing uplink data transmission and downlink data transmission by the first network device and the user equipment by using the dedicated resource configuration information are specified, thereby increasing implementations to this embodiment of this application.

Figure 6:
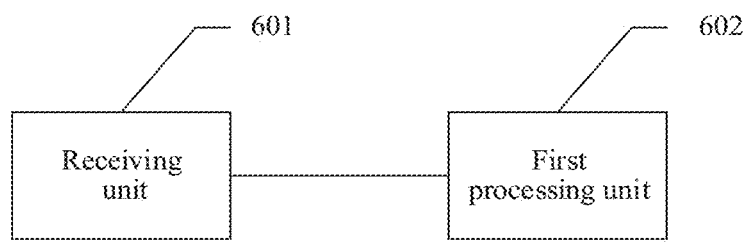
FIG. 6 is a schematic diagram of an embodiment of possible user equipment according to an embodiment of this application.

Referring to FIG. 6, in an embodiment of user equipment in this embodiment of this application, the user equipment includes a receiving unit 601 and a first processing unit 602.

The receiving unit 601 is configured to receive dedicated resource configuration information sent by a first network device, where the dedicated resource configuration information is used by the user equipment in an RRC non-connected state to access the first network device, and the RRC non-connected state is an RRC idle state or an RRC inactive state.

The first processing unit 602 is configured to perform data transmission with the first network device by using the dedicated resource configuration information.

In this embodiment of this application, the receiving unit receives the dedicated resource configuration information, and the first processing unit performs data transmission with the first network device by using the dedicated resource configuration information, so that the first network device and the user equipment can perform data transmission by using the dedicated resource configuration information, to reduce a latency and power consumption of accessing a network by the user equipment.

Figure 7:
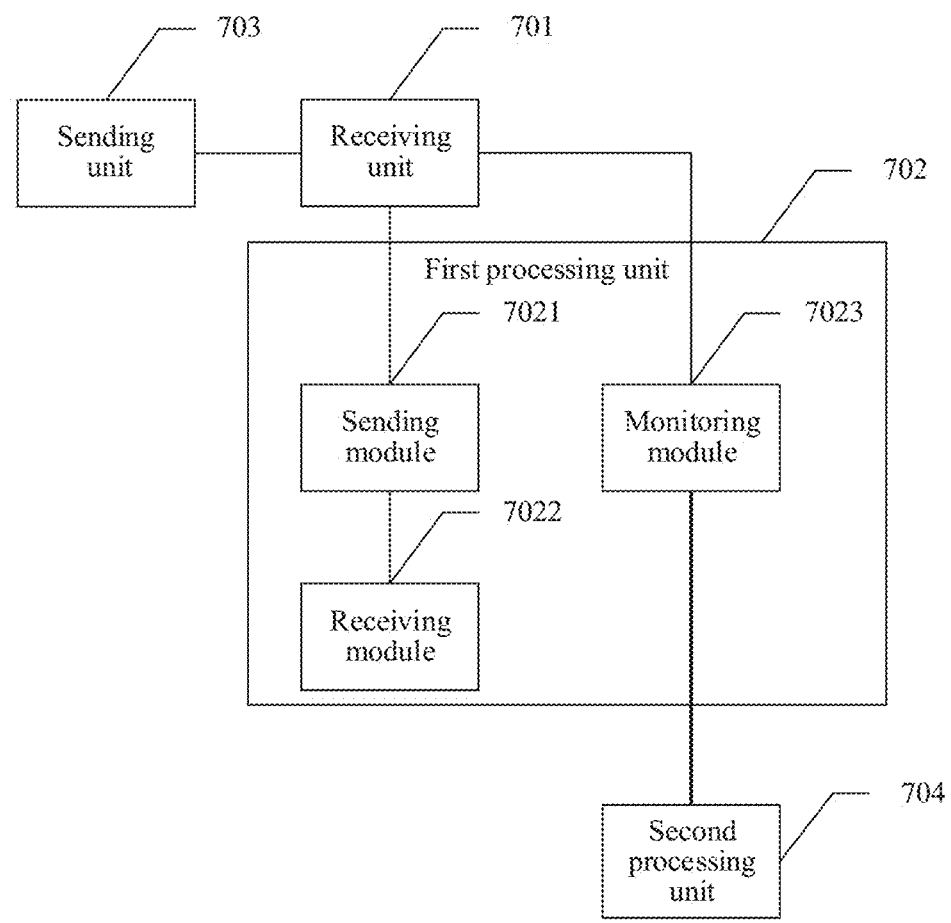
FIG. 7 is a schematic diagram of an embodiment of another possible user equipment according to an embodiment of this application.

Referring to FIG. 7, in another embodiment of user equipment in this embodiment of this application, the user equipment includes a receiving unit 701 and a first processing unit 702.

The receiving unit 701 is configured to receive dedicated resource configuration information sent by a first network device, where the dedicated resource configuration information is used by the user equipment in an RRC non-connected state to access the first network device, and the RRC non-connected state is an RRC idle state or an RRC inactive state.

The first processing unit 702 is configured to perform data transmission with the first network device by using the dedicated resource configuration information.

Optionally, the user equipment may further include a sending unit 703.

The sending unit 703 is configured to send resource configuration assistance information to the first network device, where the resource configuration assistance information includes communication pattern information of the user equipment, and the resource configuration assistance information includes one or more of the following parameters: a periodic communication indicator, communication duration, a communication period, a scheduled communication time, a scheduling starting time, a data volume indication, and a stationary indication.

Optionally, in some embodiments, the dedicated resource configuration information includes an uplink parameter and/or a downlink parameter.

The uplink parameter includes a first resource, and the first resource includes: a dedicated random access preamble for the user equipment; or a dedicated random access time-frequency resource for the user equipment; or a scheduling request SR resource; and/or the downlink parameter includes a second resource, and the second resource includes a dedicated RNTI for the user equipment, where the dedicated C-RNTI is used by the user equipment to monitor downlink data.

Optionally, in some embodiments, the uplink parameter further includes a validity time of the first resource and/or indication information, where the indication information is used to indicate service data volume information.

The downlink parameter further includes a validity time of the second resource.

Optionally, in some embodiments, the first processing unit 702 may further include a sending module 7021 and a receiving module 7022.

The sending module 7021 is configured to send a resource request message to the first network device based on the dedicated resource configuration information, where the resource request message is used to request the first network device to allocate an uplink resource.

The receiving module 7022 is configured to receive configuration information sent by the first network device, where the configuration information carries uplink grant information, and the uplink grant information is used to indicate the uplink resource used by the user equipment to send uplink data.

The sending module 7021 is further configured to send the uplink data to the first network by using the uplink resource indicated by the uplink grant information.

Optionally, in some embodiments, the sending module 7021 may be specifically configured to:

send, when the dedicated resource configuration information includes a dedicated random access preamble for the user equipment, the dedicated random access preamble for the user equipment to the first network device, where the dedicated random access preamble for the user equipment is included in the resource request message; or send, when the dedicated resource configuration information includes a dedicated random access preamble for the user equipment and a validity time of the dedicated random access preamble, the dedicated random access preamble for the user equipment to the first network device in the validity time of the dedicated random access preamble, where the dedicated random access preamble for the user equipment is included in the resource request message; or send, when the dedicated resource configuration information includes the dedicated random access time-frequency resource for the user equipment, a random access preamble to the first network device by using the dedicated random access time-frequency resource for the user equipment, where the random access preamble is included in the resource request message; or send, when the dedicated resource configuration information includes a dedicated random access time-frequency resource for the user equipment and a validity time of the dedicated random access time-frequency resource, a random access preamble to the first network device by using the dedicated random access time-frequency resource for the user equipment in the validity time of the dedicated random access time-frequency resource, where the random access preamble is included in the resource request message; or send, when the dedicated resource configuration information includes the scheduling request SR resource, an SR to the first network device on the SR resource by using the SR resource, where the SR is included in the resource request message; or send, when the dedicated resource configuration information includes the scheduling request SR resource and a validity time of the SR resource, an SR to the first network device by using the SR resource in the validity time of the SR resource, where the SR is included in the resource request message.

Optionally, in some embodiments, the sending module 7031 is specifically configured to:

send, when the uplink parameter in the dedicated resource configuration information includes the first resource, the resource request message to the first network device based on the first resource; or send, when the uplink parameter in the dedicated resource configuration information includes the first resource and the validity time of the first resource, the resource request message to the first network device based on the first resource in the validity time of the first resource.

Optionally, in some embodiments, the sending module 7031 is specifically configured to:

send, by the user equipment when the uplink parameter in the dedicated resource configuration information further includes the indication information, the resource request message to the first network device based on the first resource corresponding to the indication information.

Optionally, the first processing unit 702 may further include a monitoring module 7023, configured to:

monitor, when the dedicated resource configuration information includes a dedicated RNTI for the user equipment, a physical downlink control channel by using the dedicated RNTI, where the physical downlink control channel is used to schedule downlink data; or monitor, when the dedicated resource configuration information includes a dedicated RNTI for the user equipment and a validity time of the dedicated RNTI, in the validity time of the dedicated RNTI, a physical downlink control channel by using the dedicated RNTI, where the physical downlink control channel is used to schedule downlink data.

Optionally, the user equipment may further include a second processing unit 704.

The second processing unit 704 is configured to descramble the downlink data based on the dedicated RNTI for the user equipment.

In this embodiment of this application, contents that may be included in the uplink parameter and the downlink parameter, and how the user equipment sends the resource request message to the first network device based on the different contents in the uplink parameter or how the user equipment monitors, based on the contents in the downlink parameter, the downlink data sent by the first network device are specified, to make steps of this embodiment of this application more complete and more operable.

FIG. 4 to FIG. 7 describe the network device and the user equipment in the embodiments of this application in detail from a perspective of a modular function entity, and the network device and the user equipment in the embodiments of this application are described below in detail from a perspective of hardware processing.

1. Network Device

Figure 8:
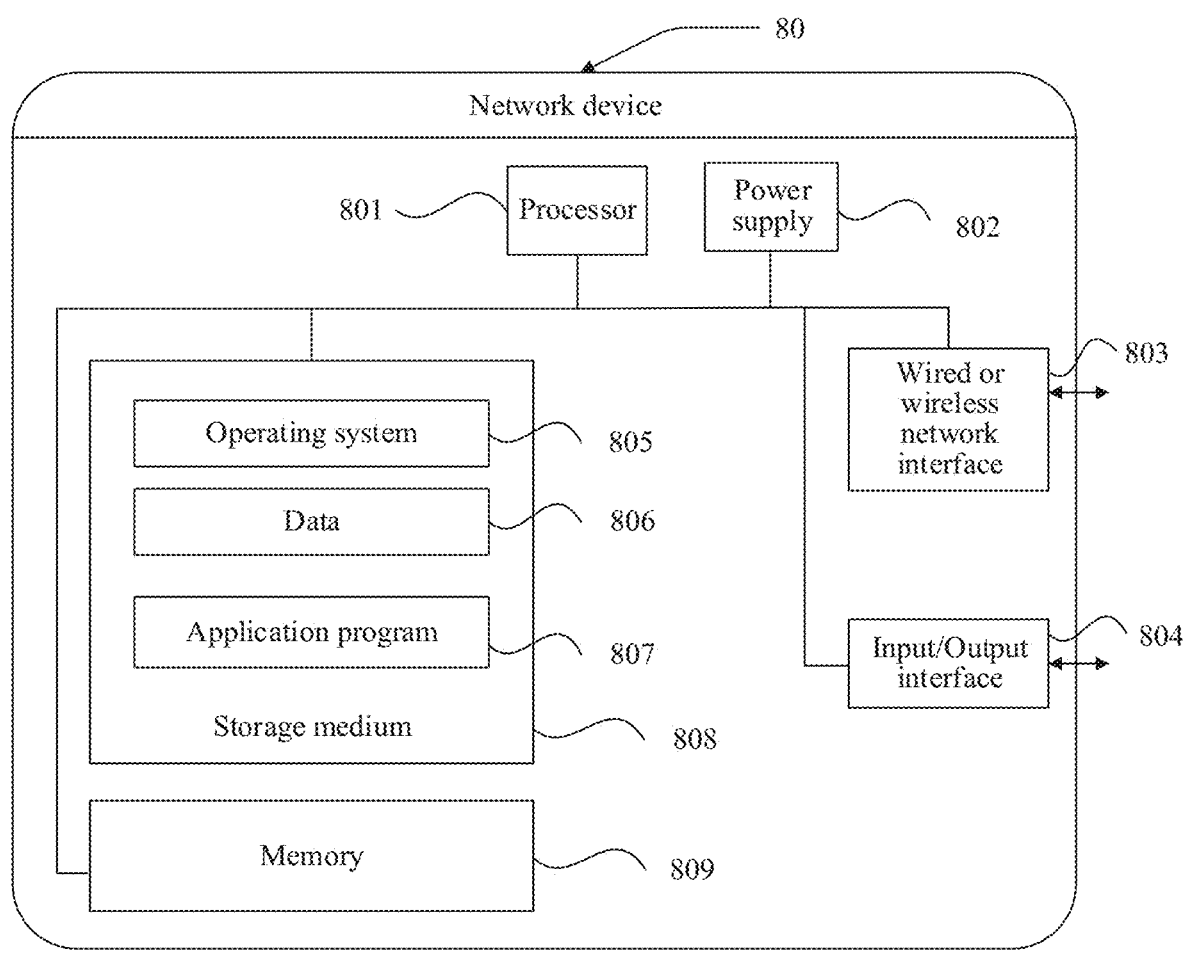
FIG. 8 is a schematic diagram of an embodiment of a possible network device according to an embodiment of this application.

FIG. 8 is a schematic structural diagram of an operator device 80 according to an embodiment of this application. The network device 80 may vary greatly due to different configurations or performance, and may include one or more processors (central processing units, CPU) 801 and one or more memories 809, one or more storage mediums 908 (for example, one or more mass storage devices) storing an application program 909 or data 909. The memory 809 and the storage medium 808 may be transient or persistent storages. The program stored in the storage medium 808 may include one or more modules (not shown in the figure), and each module may include a series of instruction operations of the network device. Still further, the processor 801 may be configured to communicate with the storage medium 808, and perform, on the network device 80, the series of instruction operations in the storage medium 808.

The network device 80 may further include one or more power supplies 802, one or more wired or wireless network interfaces 803, one or more input/output interfaces 804, and/or one or more operating systems 805 such as Windows Server, Mac OS X. Unix, Linux, and FreeBSD. A person skilled in the art may understand that the structure of the network device shown in FIG. 8 does not constitute any limitation to the network device, and may include more or fewer components than those shown in the figure, or some components may be combined, or a different component layout may be used.

The following specifically describes the components of the network device with reference to FIG. 8.

A memory 809 may be configured to store a software program and module. The processor 801 runs the software program and module stored in the memory 809, to execute various functional applications of the network device and perform data processing. The memory 809 may mainly include a program storage area and a data storage area. The program storage area may store an operating system, an application program required by at least one function (for example, an authentication function), and the like. The data storage area may store data (for example, dedicated resource configuration information) created based on use of the network device, and the like. In addition, the memory 809 may include a high speed random access memory, and may further include a nonvolatile memory such as at least one magnetic disk storage device, a flash memory, or another volatile solid-state storage device. The memory 809 may further include a read-only memory and a random access memory (Non-Volatile Random Access Memory, NVRAM), and provides an instruction and data for the processor 803. The program of the data transmission method provided in the embodiments of this application and a received data flow are stored in the memory 809, and the processor 801 invokes the program and the data flow from the memory 809 when the processor 801 needs to use the program and the data flow.

The processor 801 is a control center of the network device, and can perform processing based on the specified data transmission method. The processor 901 connects all parts of the entire network device by using various interfaces and lines, and performs various functions of the network device and processes data by running or executing the software program and/or module stored in the memory 909 and by invoking the data stored in the memory 809, to implement data transmission.

The storage medium 808 stores the following elements: an operating system 805, data 806, an application program 807, or an operation instruction, or a subset thereof, or an extended set thereof. The operation instruction includes various operation instructions used to implement various operations. The operating system 805 includes various system programs used to implement various basic services and process tasks based on hardware.

In this embodiment of this application, the input/output interface 804 is configured to receive resource configuration assistance information, and the resource configuration assistance information is used to indicate a communication pattern of the user equipment and send dedicated resource configuration information to the user equipment based on the resource configuration assistance information, where the dedicated resource configuration information is used by the user equipment in an RRC non-connected state to access the first network device, and the RRC non-connected state is an RRC idle state or an RRC inactive state.

The processor 801 is configured to perform data transmission with the user equipment by using the dedicated resource configuration information.

Optionally, in some embodiments of this application, the input/out interface 804 is specifically configured to:

receive the resource configuration assistance information sent by a second network device, where the second network device is a mobility management entity MME, a home subscriber server HSS, a service capability exposure function unit SCEF, a service capability server SCS, or an application server AS; or receive the resource configuration assistance information sent by the user equipment.

The resource configuration assistance information includes one or more of the following parameters: a periodic communication indicator, communication duration, a communication period, a scheduled communication time, a scheduling starting time, a data volume indication, and a stationary indication, for performing step 101 in FIG. 1C, step 201 in FIG. 2A, step S201 in FIG. 2D, step 301 in FIG. 3A, and step S301 in FIG. 3B. Details are not described herein again.

Optionally, in some embodiments of this application, the input/out interface 804 is specifically configured to:

receive a resource request message sent by the user equipment based on the dedicated resource configuration information, where the resource request message is used to request the first network device to allocate an uplink resource, that is, to perform step 203 in FIG. 2A, and details are not described again herein; and send uplink grant information to the user equipment, where the uplink grant information is used to indicate the uplink resource used by the user equipment to send uplink data, that is, to perform step 205 in FIG. 2A, and details are not described again herein.

Optionally, in some embodiments of this application, the input/out interface 804 is specifically configured to:

send, by the user equipment when the uplink parameter in the dedicated resource configuration information includes the first resource, the resource request message to the first network device based on the first resource; or send, by the user equipment when the uplink parameter in the dedicated resource configuration information includes the first resource and the validity time of the first resource, the resource request message to the first network device based on the first resource in the validity time of the first resource.

Optionally, in some embodiments of this application, the input/out interface 804 is specifically configured to:

send, by the user equipment when the uplink parameter in the dedicated resource configuration information further includes the indication information, the resource request message to the first network device based on the first resource corresponding to the indication information.

Optionally, in some embodiments of this application, the input/out interface 804 is specifically configured to:

send, when the dedicated resource configuration information includes a dedicated random access preamble for the user equipment, the dedicated random access preamble for the user equipment to the first network device, where the dedicated random access preamble for the user equipment is included in the resource request message; or send, when the dedicated resource configuration information includes a dedicated random access preamble for the user equipment and a validity time of the dedicated random access preamble, the dedicated random access preamble for the user equipment to the first network device in the validity time of the dedicated random access preamble, where the dedicated random access preamble for the user equipment is included in the resource request message; or send, when the dedicated resource configuration information includes a dedicated random access time-frequency resource for the user equipment, the random access preamble to the first network device by using the dedicated random access time-frequency resource for the user equipment, where the random access preamble is included in the resource request message; or send, when the dedicated resource configuration information includes a dedicated random access time-frequency resource for the user equipment and a validity time of the dedicated random access time-frequency resource, in the validity time of the dedicated random access time-frequency resource, the random access preamble to the first network device by using the dedicated random access time-frequency resource for the user equipment, where the random access preamble is included in the resource request message; or send, when the dedicated resource configuration information includes a scheduling request SR resource, an SR to the first network device by using the SR resource on the SR resource, where the SR is included in the resource request message: or send, when the dedicated resource configuration information includes the scheduling request SR resource and a validity time of the SR resource, an SR to the first network device by using the SR resource in the validity time of the SR resource, where the SR is included in the resource request message.

Optionally, in some embodiments of this application, the input/out interface 804 is further configured to:

request, when the first network device or the second network device does not activate context information of a terminal, the second network device to activate the context information of the terminal, that is, to perform step 205 in FIG. 2A. Details are not described again herein.

Optionally, in some embodiments of this application, the processor 801 is specifically configured to:

monitor, when the dedicated resource configuration information includes a dedicated RNTI for the user equipment, a physical downlink control channel by using the dedicated RNTI, where the physical downlink control channel is used to schedule downlink data; or monitor, when the dedicated resource configuration information includes the dedicated RNTI for the user equipment and a validity time of the dedicated RNTI, a physical downlink control channel by using the dedicated RNTI in the validity time of the dedicated RNTI, where the physical downlink control channel is used to schedule downlink data.

Optionally, in some embodiments of this application, the input/out interface 804 is specifically configured to:

send, by the user equipment, the uplink data to the first network device by using the uplink resource scheduling information; or receive, by the user equipment by using the downlink resource scheduling information, the downlink data sent by the first network device.

In this embodiment of this application, the input/output interface 804 receives resource configuration assistance information, where the resource configuration assistance information is used to indicate communication pattern information of the user equipment; and send the dedicated resource configuration information to the user equipment based on the resource configuration assistance information, where the dedicated resource configuration information is used by the user equipment in an RRC non-connected state to access the first network device, and the RRC non-connected state is an RRC idle state or an RRC inactive state. The processor 803 performs data transmission with the user equipment by using the dedicated resource configuration information. Therefore, the user equipment in the RRC non-connected state can access a first network device through a dedicated access resource configured by the first network device, and the user equipment can further send the uplink data to the first network device on the specified resource configured by the first network device, thereby reducing a latency of accessing a network by the user equipment and reducing power consumption during the process of accessing the network by the user equipment.

The processor 801 controls an operation of the network device 80, and the processor 801 may be further referred to as a central processing unit (Central Processing Unit, CPU). The memory 809 may include a read-only memory and a random access memory, and provide an instruction and data to the processor 801. During specific application, components of the network device 80 are coupled together by using a bus system. In addition to a data bus, the bus system may further include a power bus, a control bus, and a status signal bus.

The method described in the embodiments of this application may be applied to the processor 801, or may be implemented by the processor 801. The processor 801 may be an integrated circuit chip and has a signal processing capability. In an implementation process, steps in the foregoing methods can be implemented by using a hardware integrated logic circuit in the processor 803, or by using instructions in a form of software. The processor 801 may be a general purpose processor, a digital signal processor (Digital Signal Processor, DSP), an application-specific integrated circuit (Application Specific Integrated Circuit, ASIC), a field-programmable gate array (Field-Programmable Gate Array, FPGA) or another programmable logic device, a discrete gate or transistor logic device, or a discrete hardware component. It may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by means of a hardware decoding processor, or may be executed and accomplished by using a combination of hardware and software modules in the decoding processor. The software module may be located in a mature storage medium 808 in this field, such as a random access memory, a flash memory, a read-only memory, a programmable read-only memory or an electrically erasable programmable memory, a register, and the like. The processor 801 reads information in the memory 809 or the storage medium 808, and implements the steps of the foregoing method in combination with the hardware.

2. User Equipment

Figure 9A:
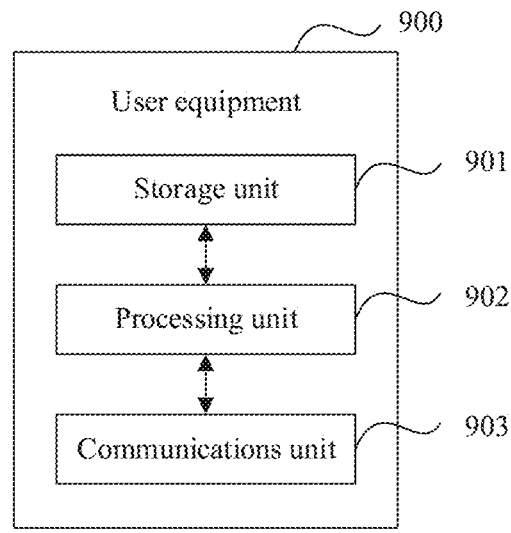
FIG. 9A is a schematic structural diagram of possible user equipment according to an embodiment of this application.

FIG. 9A is a schematic structural block diagram of possible user equipment according to an embodiment of this application. Referring to FIG. 9A, for ease of description, only a part related to the embodiments of this application is shown. For a specific technical detail that is not disclosed, refer to a method part in the embodiments of this application. The user equipment may include an intelligent water meter, an intelligent electricity meter, a monitor, or the like. Alternatively, the user equipment may be a device that has a relatively small moving range and that usually does not change a serving cell thereof, for example, a smart household appliance that moves inside a room and is usually not moved out of the room, and the user equipment may further be a device that stays stationary in a fairly long time. For example, in location tracking of an express parcel, a positioning device stays stationary when the express parcel is in a warehouse.

In FIG. 9A, when an integrated unit is used, FIG. 9A is a possible schematic structural diagram of the user equipment included in the foregoing embodiment. User equipment 900 includes: a processing unit 902 and a communications unit 903. The processing unit 902 is configured to control and manage an action of the user equipment. In this embodiment of this application, the processing unit 902 is configured to: perform data transmission with the first network device by using the dedicated resource configuration information.

Optionally, in some embodiments of this application, the processing unit 902 is specifically configured to:

monitor, when the dedicated resource configuration information includes a dedicated RNTI for the user equipment, a physical downlink control channel by using the dedicated RNTI, where the physical downlink control channel is used to schedule downlink data; or monitor, when the dedicated resource configuration information includes the dedicated RNTI for the user equipment and a validity time of the dedicated RNTI, a physical downlink control channel by using the dedicated RNTI in the validity time of the dedicated RNTI, where the physical downlink control channel is used to schedule downlink data.

Optionally, in some embodiments of this application, the processing unit 902 is further configured to:

descramble the downlink data based on the dedicated RNTI for the user equipment in the validity time of the dedicated RNTI.

For example, in the foregoing method embodiment, the processing unit 902 is configured to support the user equipment in performing step 102 in FIG. 1C, step 202 and step 204 in FIG. 2A, step S202 in FIG. 2D, step 302 in FIG. 3A, step S302 in FIG. 3B, and/or another process for the technology described in this specification.

In addition, the communications unit 903 is configured to support communication between the user equipment and another network entity. In this embodiment of this application, the communications unit 903 is configured to receive dedicated resource configuration information sent by a first network device, where the dedicated resource configuration information is used by the user equipment in an RRC non-connected state to access the first network device, and the RRC non-connected state is an RRC idle state or an RRC inactive state.

Optionally, in some embodiments of this application, the communications unit 903 is further configured to:

send resource configuration assistance information to the first network device, where the resource configuration assistance information includes a communication pattern of the user equipment, where the resource configuration assistance information includes one or more of the following parameters: a periodic communication indicator, communication duration, a communication period, a scheduled communication time, a scheduling starting time, a data volume indication, and a stationary indication.

Optionally, in some embodiments of this application, the communications unit 903 is specifically configured to:

send, when an uplink parameter in the dedicated resource configuration information includes a first resource, the resource request message to the first network device based on the first resource; or send, when an uplink parameter in the dedicated resource configuration information includes the first resource and a validity time of the first resource, the resource request message to the first network device based on the first resource in the validity time of the first resource.

Optionally, in some embodiments of this application, the communications unit 903 is specifically configured to:

send, when the uplink parameter in the dedicated resource configuration information further includes the indication information, the resource request message to the first network device based on the first resource corresponding to the indication information.

Optionally, in some embodiments of this application, the communications unit 903 is specifically configured to:

send a resource request message to the first network device based on the dedicated resource configuration information, where the resource request message is used to request the first network device to allocate an uplink resource; receive configuration information sent by the first network device, where the configuration information carries uplink grant information, and the uplink grant information is used to indicate the uplink resource used by the user equipment to send uplink data; and send the uplink data to the first network by using the uplink resource indicated by the uplink grant information.

Optionally, in some embodiments of this application, the communications unit 903 is specifically configured to:

send, to the first network device when the dedicated resource configuration information includes a dedicated random access preamble for the user equipment, the dedicated random access preamble for the user equipment to the first network device, where the dedicated random access preamble for the user equipment is included in the resource request message; or send, when the dedicated resource configuration information includes a dedicated random access preamble for the user equipment and a validity time of the dedicated random access preamble, the dedicated random access preamble for the user equipment to the first network device in the validity time of the dedicated random access preamble, where the dedicated random access preamble for the user equipment is included in the resource request message; or send, when the dedicated resource configuration information includes a dedicated random access time-frequency resource for the user equipment, the random access preamble to the first network device by using the dedicated random access time-frequency resource for the user equipment, where the random access preamble is included in the resource request message; or send, when the dedicated resource configuration information includes a dedicated random access time-frequency resource for the user equipment and a validity time of the dedicated random access time-frequency resource, in the validity time of the dedicated random access time-frequency resource, the random access preamble to the first network device by using the dedicated random access time-frequency resource for the user equipment, where the random access preamble is included in the resource request message; or send, when the dedicated resource configuration information includes a scheduling request SR resource, an SR to the first network device by using the SR resource, where the SR is included in the resource request message; or send, when the dedicated resource configuration information includes the scheduling request SR resource and a validity time of the SR resource, an SR to the first network device by using the SR resource in the validity time of the SR resource, where the SR is included in the resource request message.

For example, in the foregoing method embodiment, the communications unit 903 is configured to support the user equipment in performing step 102 and step 103 in FIG. 1C, step 202, step 203, step 205 and step 206 in FIG. 2A, step S202 and step S203 in FIG. 2D, step 302 and step 303 in FIG. 3A, step S302 and step S303 in FIG. 3B, and/or another process for the technology described in this specification.

The user equipment may further include a storage unit 901, and the storage unit 901 can be configured to store a software program and a module. The processing unit 902 executes various functional applications of user equipment and data processing by running the software program and the module that are stored in the storage unit 901. The storage unit 901 may mainly include a program storage area and a data storage area. The program storage area may store an operating system, an application program required by at least one function (such as a sound playback function and an image display function), and the like. The data storage area may store data (such as audio data and an address book) created based on use of a mobile phone, and the like. In addition, the storage unit 901 may include a high speed random access memory, and may further include a nonvolatile memory such as at least one magnetic disk storage device, a flash memory, or another volatile solid-state storage device. The storage unit 901 is further configured to store program code and data of a forwarding device.

The processing unit 902 may be a processor or a controller, such as a central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA), or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor, and or the like. The communications unit 903 may be a communications interface, a transceiver, a transceiver circuit, or the like. The communications interface is a general term, and may include one or more interfaces such as a transceiver interface. The storage unit 901 may be a memory.

Figure 9B:
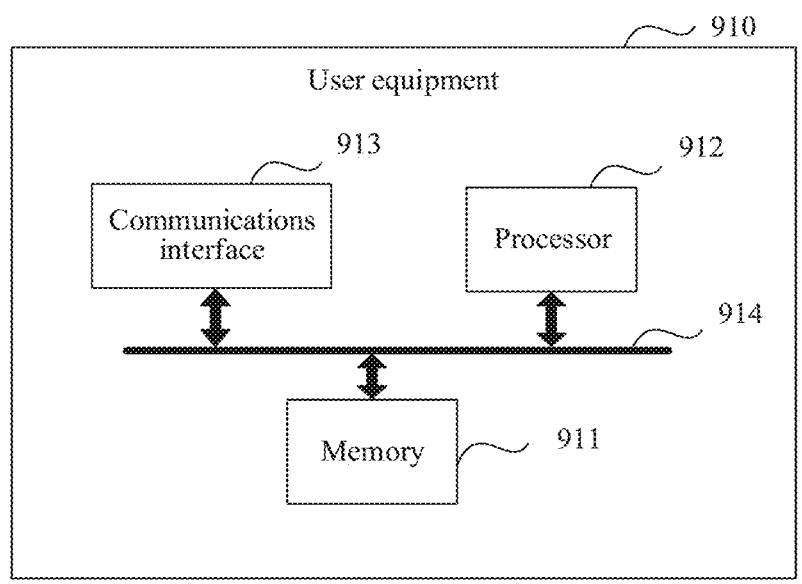
FIG. 9B is an architectural diagram of possible user equipment according to an embodiment of this application.

When the processing unit 902 is a processor, the communications unit 903 is a communications interface, and the storage unit 901 is a memory, the user equipment in this embodiment of this application may be the user equipment shown in FIG. 9B.

Referring to FIG. 9B, the user equipment 910 includes: a processor 912, a communications interface 913, and a memory 911. Optionally, the user equipment 910 may further include a bus 914. The communications interface 913, the processor 912, and the memory 911 can be interconnected by using the bus 914. The bus 914 may be a peripheral component interconnect (peripheral component interconnect, PCI) bus, an extended industry standard architecture (extended industry standard architecture, EISA) bus, or the like. The bus 914 may be classified into an address bus, a data bus, a control bus, and the like. For ease of representation, only one thick line is used to represent the bus in FIG. 9B, but this does not mean that there is only one bus or only one type of bus.

Although not shown, the user equipment in this embodiment of this application may further include a camera, a Wi-Fi module, a Bluetooth module, and the like, and details are not described herein again.

In this embodiment of this application, the communications unit 903 receives the dedicated resource configuration information sent by the first network device, where the dedicated resource configuration information is used by the user equipment in an RRC non-connected state to access the first network device, and the RRC non-connected state is an RRC idle state or an RRC inactive state; and the processing unit 902 performs data transmission with the first network device by using the dedicated resource configuration information. In addition, the user equipment can further send the uplink data to the first network device on the specified resource configured by the first network device, so that a latency of accessing a network by the user equipment and power consumption during the process of accessing the network by the user equipment are reduced.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separated, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
   receiving resource configuration assistance information, wherein the resource configuration assistance information is used to indicate a communication pattern of user equipment;
   sending dedicated resource configuration information to the user equipment based on the resource configuration assistance information, wherein the dedicated resource configuration information is configured during a radio resource control (RRC) connection release process, wherein the dedicated resource configuration information is used, by the user equipment in a RRC non-connected state after the RRC connection release process, to send uplink data to a first network device using dedicated access resource without performing a random access procedure, wherein the dedicated resource configuration information comprises uplink resource scheduling information, wherein the uplink resource scheduling information is used by the user equipment to send the uplink data to the first network device, and wherein the RRC non-connected state is an RRC idle state or an RRC inactive state; and
   performing, by the first network device, data transmission with the user equipment by using the dedicated resource configuration information.

2. The method according to claim 1, wherein the receiving resource configuration assistance information comprises:
   receiving the resource configuration assistance information sent by a second network device, wherein the second network device is a mobility management entity (MME) or a home subscriber server (HSS) or a service capability exposure function unit (SCEF) or a service capability server (SCS) or an application server (AS); or
   receiving the resource configuration assistance information sent by the user equipment, wherein the resource configuration assistance information comprises one or more of the following parameters: a periodic communication indicator, communication duration, a communication period, a scheduled communication time, a scheduling starting time, a data volume indication, or a stationary indication.

3. The method according to claim 1, wherein:
   the uplink resource scheduling information indicates, to the user equipment, a position of a radio resource for sending the uplink data.

4. The method according to claim 1, wherein
   the uplink resource scheduling information includes one or more pieces of the following information: a resource block index (RB index), an RB position, a modulation and coding scheme (MCS), or a resource scheduling period.

5. The method according to claim 1, wherein the dedicated resource configuration information comprises a dedicated random access preamble for the user equipment, wherein the first network device maintains a mapping relationship between the dedicated random access preamble and identity information of the user equipment, and wherein the method comprises:
receiving the dedicated random access preamble from the user equipment; and
obtaining, based on the mapping relationship and the received dedicated random access preamble, the identity information of the user equipment.

6. The method according to claim 1, wherein the dedicated resource configuration information indicates a data volume of the uplink data, and wherein the method comprises:
determining, based on the resource configuration assistance information, the data volume of the uplink data; and
allocating the dedicated access resource based on the data volume.

7. A data transmission method, comprising:
receiving dedicated resource configuration information from a first network device, wherein the dedicated resource configuration information is configured during a radio resource control (RRC) connection release process, wherein the dedicated resource configuration information is used, by user equipment in a RRC non-connected state after the RRC connection release process, to send uplink data to the first network device using dedicated access resource without performing a random access procedure, wherein the dedicated resource configuration information comprises uplink resource scheduling information, wherein the uplink resource scheduling information is used by the user equipment to send the uplink data to the first network device, and wherein the RRC non-connected state is an RRC idle state or an RRC inactive state; and
performing data transmission with the first network device by using the dedicated resource configuration information in the RRC non-connected state.

8. The method according to claim 7, wherein the method further comprises:
sending resource configuration assistance information to the first network device, wherein the resource configuration assistance information is used to indicate a communication pattern of the user equipment, and wherein the resource configuration assistance information comprises one or more of the following parameters: a periodic communication indicator, communication duration, a communication period, a scheduled communication time, a scheduling starting time, a data volume indication, or a stationary indication.

9. The method according to claim 7, wherein the performing data transmission with the first network device by using the dedicated resource configuration information comprises:
in response to determining that the dedicated resource configuration information comprises a dedicated radio network temporary identifier (RNTI) for the user equipment, monitoring physical downlink control information by using the dedicated RNTI, wherein the physical downlink control information is used to schedule downlink data; or in response to determining that the dedicated resource configuration information comprises the dedicated RNTI for the user equipment and a validity time of the dedicated RNTI, monitoring physical downlink control information by using the dedicated RNTI in the validity time of the dedicated RNTI, wherein the physical downlink control information is used to schedule the downlink data.

10. The method according to claim 7, wherein the dedicated resource configuration information comprises downlink resource scheduling information, and wherein the downlink resource scheduling information is used by the first network device to send downlink data to the user equipment.

11. The method according to claim 10, wherein:
the uplink resource scheduling information indicates, to the user equipment, a position of a radio resource for sending the uplink data.

12. The method according to claim 10, wherein
the uplink resource scheduling information includes one or more pieces of the following information: a resource block index (RB index), an RB position, a modulation and coding scheme (MCS), or a resource scheduling period.

13. An apparatus, comprising:
one or more processors; and
a non-transitory storage medium configured to store program instructions, wherein, when executed by the one or more processors, the program instructions cause the apparatus to perform a method that comprises:
receiving dedicated resource configuration information from a first network device, wherein the dedicated resource configuration information is configured during a radio resource control (RRC) connection release process, wherein the dedicated resource configuration information is used, by user equipment in a RRC non-connected state after the RRC connection release process, to send uplink data to the first network device, wherein the dedicated resource configuration information comprises uplink resource scheduling information, wherein the uplink resource scheduling information is used by the user equipment to send the uplink data to the first network device using dedicated access resource without performing a random access procedure, and wherein the RRC non-connected state is an RRC idle state or an RRC inactive state; and
performing data transmission with the first network device by using the dedicated resource configuration information.

14. The apparatus according to claim 13, wherein the method further comprises:
sending resource configuration assistance information to the first network device, wherein the resource configuration assistance information is used to indicate a communication pattern of the user equipment, and wherein the resource configuration assistance information comprises one or more of the following parameters: a periodic communication indicator, communication duration, a communication period, a scheduled communication time, a scheduling starting time, a data volume indication, or a stationary indication.

15. The apparatus according to claim 13, wherein:
the dedicated resource configuration information comprises at least one of an uplink parameter or a downlink parameter;

the uplink parameter comprises a first resource, and wherein the first resource comprises at least one of a dedicated random access preamble for the user equipment, a dedicated random access time-frequency resource for the user equipment, or a scheduling request SR resource; and the downlink parameter comprises a second resource, wherein the second resource comprises a dedicated radio network temporary identifier (RNTI) for the user equipment, wherein the dedicated RNTI is used by the user equipment to monitor downlink data.

16. The apparatus according to claim 13, wherein
the uplink resource scheduling information includes one or more pieces of the following information: a resource block index (RB index), an RB position, a modulation and coding scheme (MCS), or a resource scheduling period.

17. An apparatus, comprising:
one or more processors, and
a non-transitory storage medium configure to store program instructions, wherein, when executed by the one or more processors, the program instructions cause the apparatus to perform a method that comprises:
receiving resource configuration assistance information, wherein the resource configuration assistance information is used to indicate a communication pattern of user equipment;
sending dedicated resource configuration information to the user equipment based on the resource configuration assistance information, wherein the dedicated resource configuration information is configured during a radio resource control (RRC) connection release process, wherein the dedicated resource configuration information is used, by the user equipment in a RRC non-connected state after the RRC connection release process, to send uplink data to a first network device using dedicated access resource without performing a random access procedure, wherein the dedicated resource configuration information comprises uplink resource scheduling information, wherein the uplink resource scheduling information is used by the user equipment to send the uplink data to the first network device, and wherein the RRC non-connected state is an RRC idle state or an RRC inactive state; and performing, by the first network device, data transmission with the user equipment by using the dedicated resource configuration information.

18. The apparatus according to claim 17, wherein the receiving resource configuration assistance information comprises:
receiving the resource configuration assistance information sent by a second network device, wherein the second network device is a mobility management entity (MME) or a home subscriber server (HSS) or a service capability exposure function unit (SCEF) or a service capability server (SCS) or an application server (AS); or receiving the resource configuration assistance information sent by the user equipment, wherein the resource configuration assistance information comprises one or more of the following parameters: a periodic communication indicator, communication duration, a communication period, a scheduled communication time, a scheduling starting time, a data volume indication, or a stationary indication.

19. The apparatus according to claim 17, wherein:
the uplink resource scheduling information indicates, to the user equipment, a position of a radio resource for sending the uplink data.

20. The apparatus according to claim 17, wherein
the uplink resource scheduling information includes one or more pieces of the following information: a resource block index (RB index), an RB position, a modulation and coding scheme (MCS), or a resource scheduling period.

\* \* \* \* \*